(12) United States Patent
Kubo

(10) Patent No.: US 10,607,103 B2
(45) Date of Patent: Mar. 31, 2020

(54) IMAGE PROCESSING APPARATUS, CONTROL METHOD THEREFOR, AND PROGRAM

(71) Applicant: Konica Minolta, Inc., Chiyoda-ku, Tokyo (JP)

(72) Inventor: Hiroaki Kubo, Muko (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 106 days.

(21) Appl. No.: 15/916,347

(22) Filed: Mar. 9, 2018

(65) Prior Publication Data

US 2018/0285681 A1 Oct. 4, 2018

(30) Foreign Application Priority Data

Mar. 29, 2017 (JP) .................. 2017-065980

(51) Int. Cl.
| | | |
|---|---|---|
| *G06K 9/46* | (2006.01) | |
| *G06T 11/60* | (2006.01) | |
| *H04N 1/193* | (2006.01) | |
| *G06K 9/00* | (2006.01) | |

(52) U.S. Cl.
CPC ....... *G06K 9/4642* (2013.01); *G06K 9/00456* (2013.01); *G06K 9/468* (2013.01); *G06T 11/60* (2013.01); *H04N 1/193* (2013.01); *G06K 9/4604* (2013.01)

(58) Field of Classification Search
CPC .. G06K 9/4642; G06K 9/00456; G06K 9/468; G06K 9/4604; H04N 1/193; G06T 11/60
See application file for complete search history.

(56) References Cited

U.S. PATENT DOCUMENTS

| | | | | |
|---|---|---|---|---|
| 6,324,305 B1* | 11/2001 | Holladay | ........... | G06K 9/00456 |
| | | | | 358/1.15 |
| 2004/0151377 A1* | 8/2004 | Boose | ................ | G06K 9/00476 |
| | | | | 382/193 |
| 2009/0015868 A1* | 1/2009 | Kim | ...................... | G06F 3/1207 |
| | | | | 358/1.18 |
| 2010/0060935 A1* | 3/2010 | Nakao | .................. | G06F 3/1215 |
| | | | | 358/1.18 |

(Continued)

FOREIGN PATENT DOCUMENTS

| | | |
|---|---|---|
| JP | 2003051928 A | 2/2003 |
| JP | 2004289476 A | 10/2004 |
| JP | 2007053651 A | 3/2007 |

*Primary Examiner* — John B Strege
(74) *Attorney, Agent, or Firm* — Buchanan Ingersoll & Rooney PC

(57) ABSTRACT

An image processing apparatus includes: a hardware processor that: generates image data in a raster form on the basis of PDL data described in a page description language; stores the image data generated by the hardware processor; and outputs a predetermined signal in a case where an image of the image data stored in the hardware processor is determined as an image including a predetermined pattern, wherein the hardware processor executes pattern recognition with respect to a region, which includes printing data, in the image of the image data, and does not execute the pattern recognition with respect to a region, which does not include printing data, in the image of the image data.

16 Claims, 22 Drawing Sheets

(56) References Cited

U.S. PATENT DOCUMENTS

| | | | | |
|---|---|---|---|---|
| 2010/0060936 | A1* | 3/2010 | Shitara | G06T 11/60 |
| | | | | 358/1.18 |
| 2012/0257253 | A1* | 10/2012 | Isshiki | G06K 15/1849 |
| | | | | 358/1.16 |
| 2013/0057881 | A1* | 3/2013 | Nishide | H04N 1/54 |
| | | | | 358/1.9 |
| 2014/0293301 | A1* | 10/2014 | Yamada | H04N 1/54 |
| | | | | 358/1.9 |
| 2015/0070373 | A1* | 3/2015 | Clinton | G06F 17/214 |
| | | | | 345/589 |
| 2015/0178605 | A1* | 6/2015 | Chang | G06K 15/1849 |
| | | | | 358/3.27 |
| 2016/0173727 | A1* | 6/2016 | Kimura | G06T 11/60 |
| | | | | 358/2.1 |
| 2016/0350632 | A1* | 12/2016 | Sakashita | G06K 15/1827 |
| 2017/0361630 | A1* | 12/2017 | Harigae | B41J 2/32 |
| 2018/0096201 | A1* | 4/2018 | Bermundo | G06K 9/00456 |

* cited by examiner (1) CREATE PRINT DATA
FROM PRINT LANGUAGE (2) FORM PREDETERMINED IMAGE BY ARRANGEMENT OPERATION OF SIZE OF EACH PIECE OF DATA (3) CREATE PRINT DATA BASED ON ARRANGEMENT INFORMATION

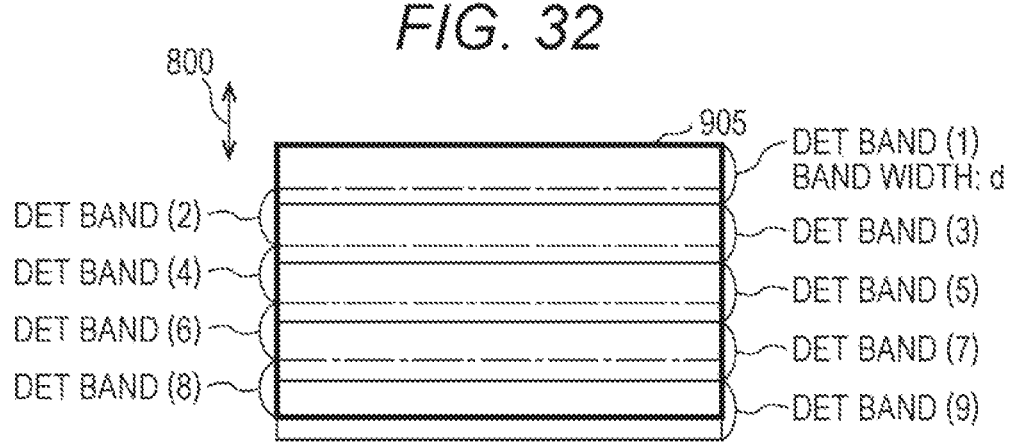
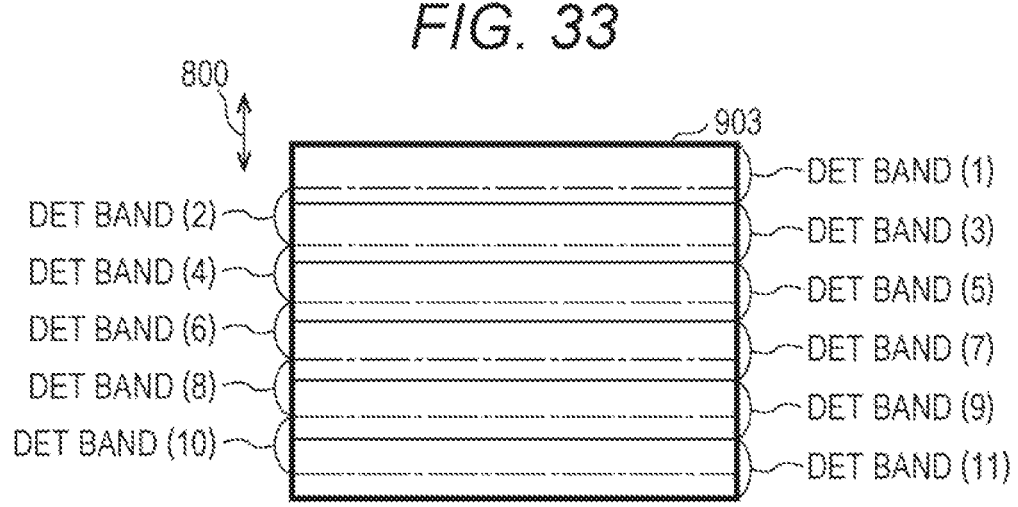

FIG. 42
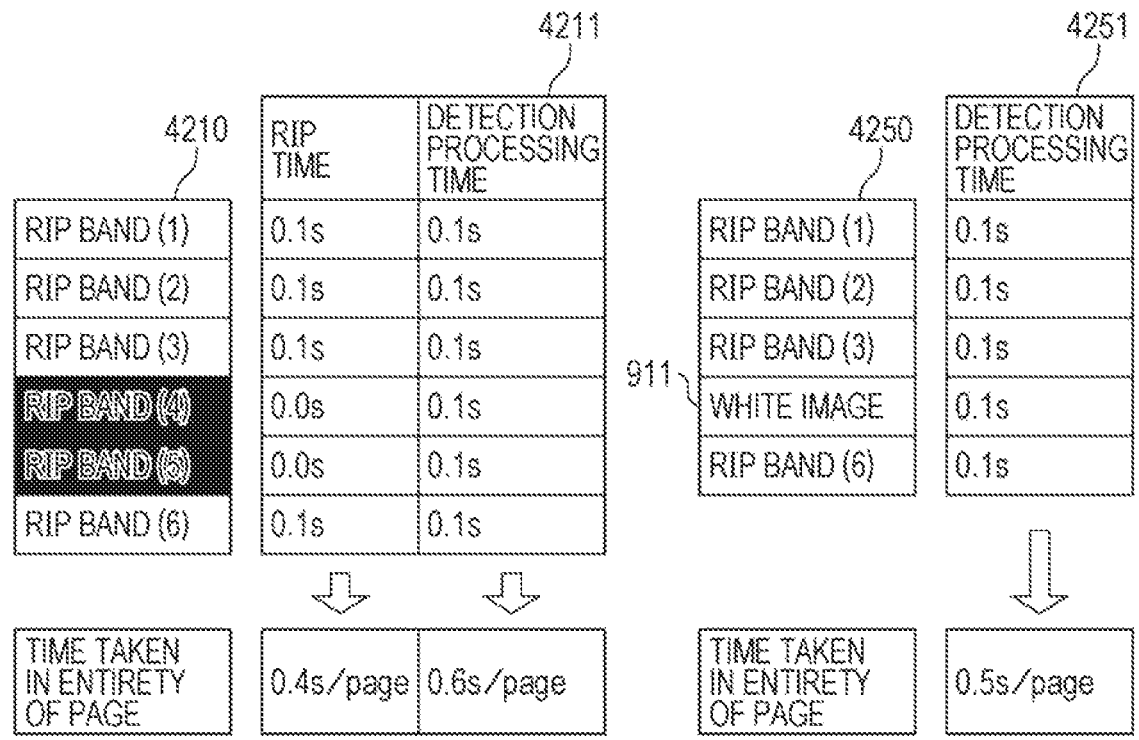
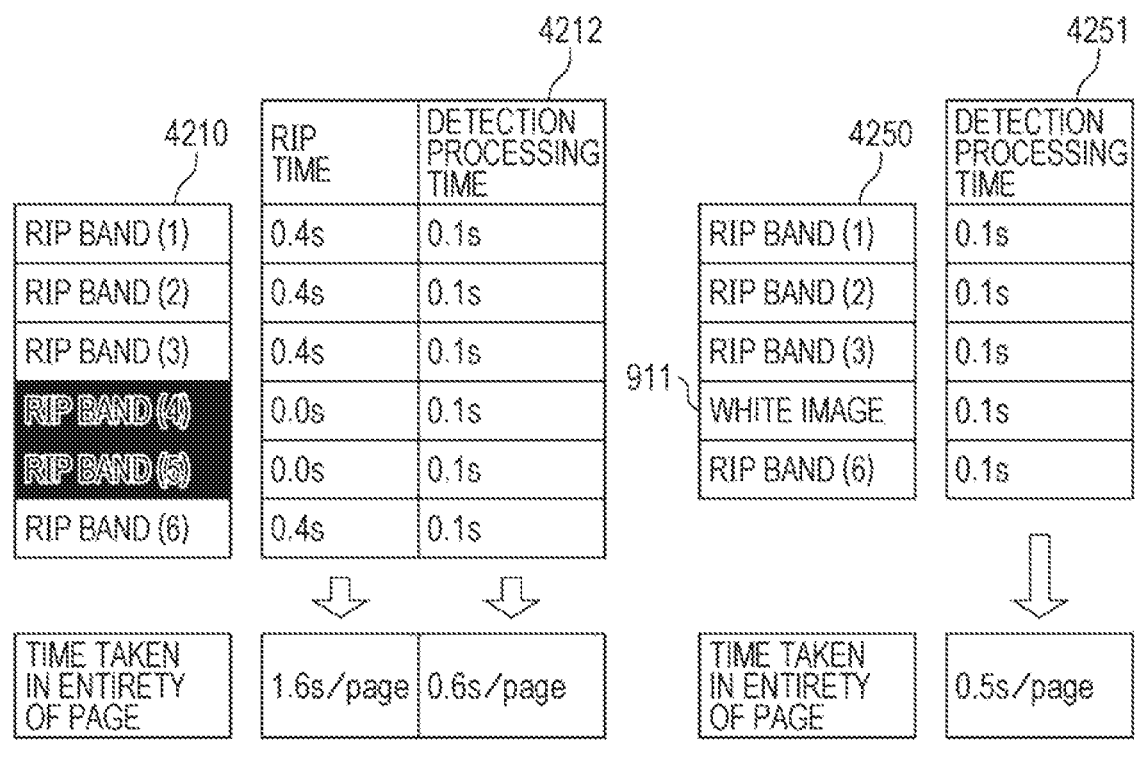

IMAGE PROCESSING APPARATUS, CONTROL METHOD THEREFOR, AND PROGRAM

The entire disclosure of Japanese patent Application No. 2017-065980, filed on Mar. 29, 2017, is incorporated herein by reference in its entirety.

BACKGROUND

Technological Field

The present disclosure relates to an image processing apparatus, and particularly to, an image processing apparatus that executes processing of converting image data into printing image data, a method for controlling the image processing apparatus, and a program that causes a computer to execute the processing.

Description of the Related Art

Among image processing apparatuses in the related art, there is known an image processing apparatus that executes processing in accordance with contents of image data. For example, JP 2004-289476 A discloses an image processing apparatus including a white paper display unit that determines whether or not image data accumulated represents white paper for every page, and displays an image on the basis of image data of a page determined as white paper.

In addition, there is known an image processing apparatus that executes processing of detecting printing image data to avoid minting of a print-prohibited image such as securities and paper money. With regard to printing avoidance of the print-prohibited image in the image processing apparatus, various technologies are suggested.

For example, JP 2007-053651 A discloses an image reading apparatus that sequentially accumulates read-out image data in a line unit in a buffer, performs pattern recognition with respect to image processing apparatus data that is accumulated, and instructs an printing apparatus to stop printing processing of the image data when detecting a print-prohibited image.

JP 2003-051928 A discloses an image processing apparatus that cuts out an arbitrary range in image information that is input, and adds the cut-out image to an arbitrary position of another piece of image information.

In addition, there is disclosed an image processing apparatus that converts image data, which is generated by an application installed, in a computer and the like, into printing image data through processing such as raster image processor (RIP) processing.

A rate of conversion processing such as the RIP processing greatly depends on contents of image data, but a rate of detection processing less depends on the contents of the image data. For example, in a case where image data includes a relatively large white data region (a region that does not include printing data), it is not necessary to perform data conversion from a vector form into a raster form with respect to the white data region, and thus processing time, which is necessary for the RIP processing of the entirety of the image data, is relatively shortened. On the other hand, a length of time, which is necessary for the detection processing, corresponds to a printing region, to which image data corresponds, regardless of contents of the image data.

Therefore, in the image processing apparatus, in a case where a lot of white data regions are included, the detection processing becomes a rate-limiting factor, and initiation of printing processing of the image data after conversion may be retarded.

SUMMARY

The present disclosure has been made in consideration of the above-described circumstance, and an object thereof is to shorten time necessary for detection processing for avoidance of printing of a prohibited image and the like in an image processing apparatus.

To achieve the abovementioned object, according to an aspect of the present invention, an image processing apparatus reflecting one aspect of the present invention comprises: a hardware processor that: generates image data in a raster form on the basis of PDL data described in a page description language; stores the image data generated by the hardware processor; and outputs a predetermined, signal in a case where an image of the image data stored in the hardware processor is determined as an image including a predetermined pattern, wherein the hardware processor executes pattern recognition with respect to a region, which includes printing data, in the image of the image data, and does not execute the pattern recognition with respect to a region, which does not include printing data, in the image of the image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 32 is a view illustrating an effect due to exclusion of a part of an image from the detection processing target;

FIG. 33 is a view illustrating the effect due to exclusion of a part of an image from the detection processing target;

FIG. 42 is a view illustrating an example of an effect of the processing in FIG. 41.

DETAILED DESCRIPTION OF EMBODIMENTS

Figure 1:
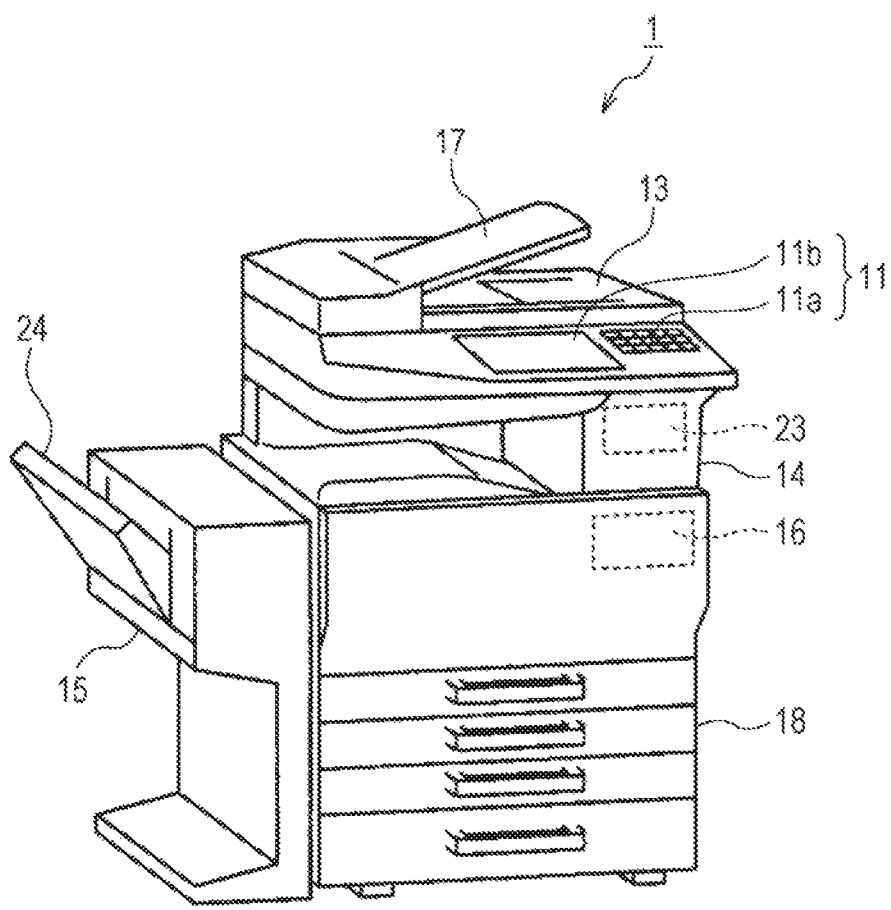
FIG. 1 is a view illustrating an external appearance of an image processing apparatus according to an embodiment of the present disclosure.

Hereinafter, one or more embodiments of an image processing apparatus according to the present invention will be described with reference to the drawings. However, the scope of the invention is not limited to the disclosed embodiments. In the following description, the same reference numeral will be given to the same component or the same constituent element. A name and a function thereof is the same in each case. Accordingly, description thereof will not be repeated.

[1. Configuration of Image Processing Apparatus]

Figure 2:
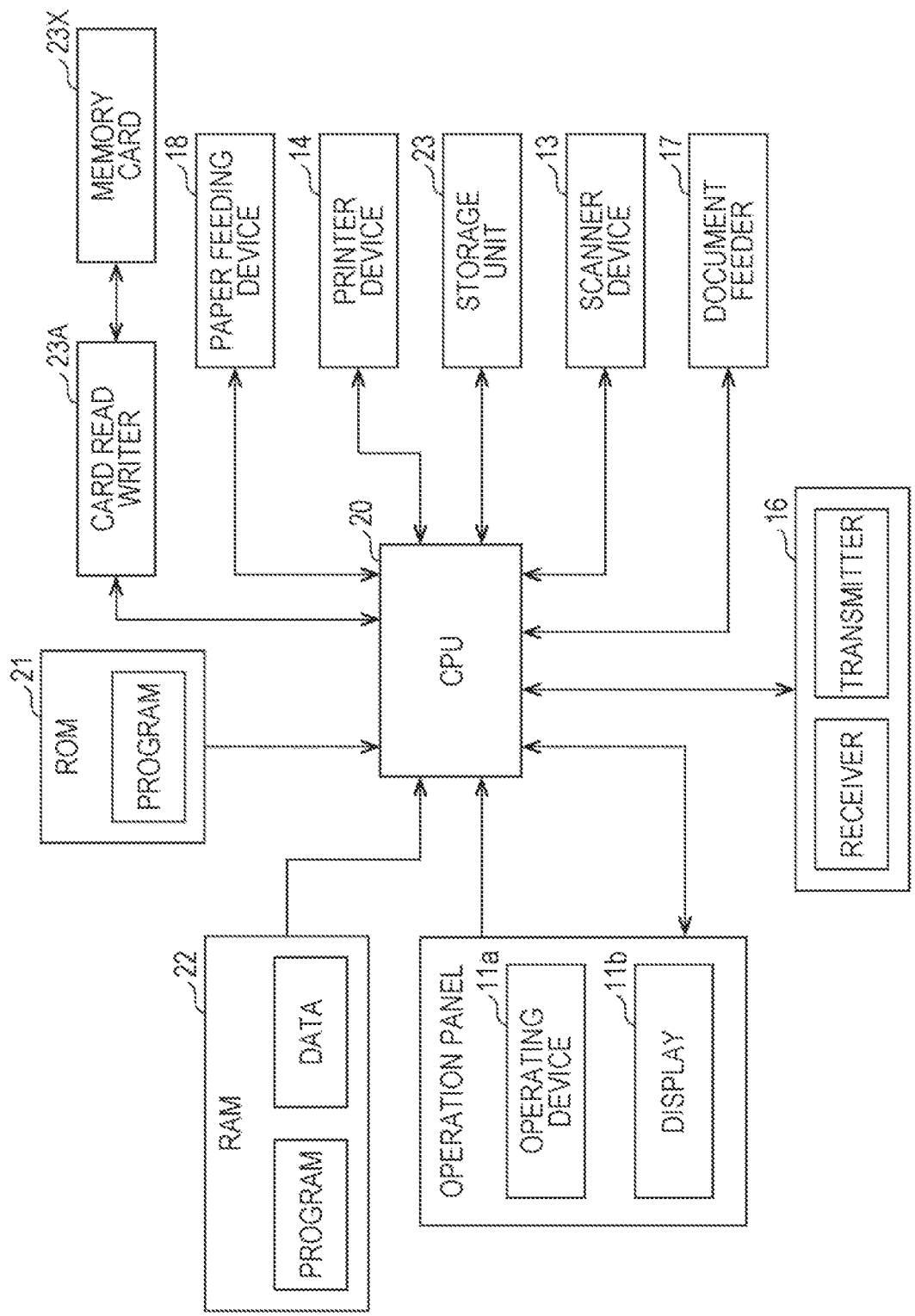
FIG. 2 is a view illustrating a hardware configuration of the image processing apparatus in FIG. 1.
Figure 3:
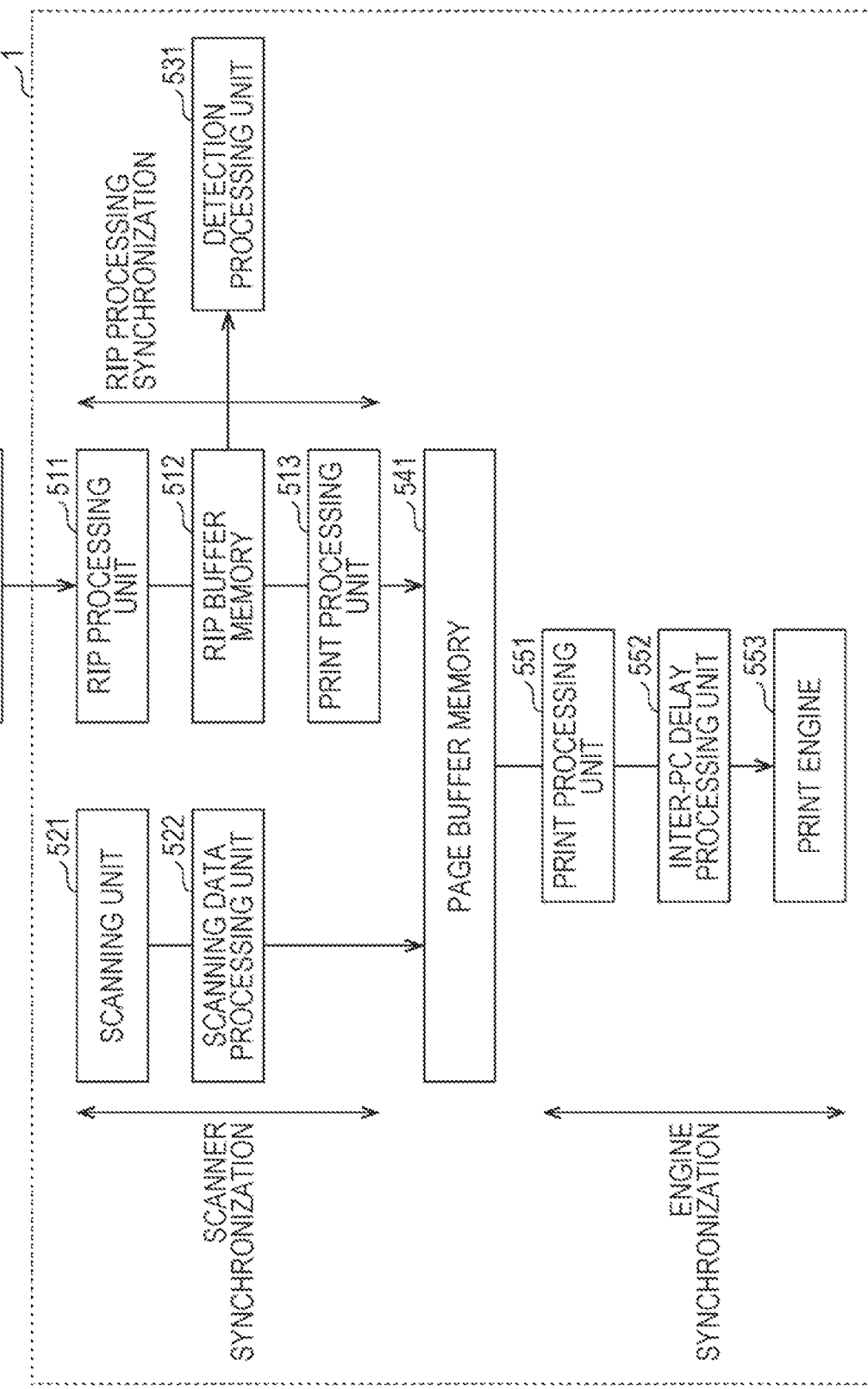
FIG. 3 is a view illustrating a functional configuration of the image processing apparatus.

A configuration of an image processing apparatus 1 will be described with reference to FIGS. 1, 2, and 3.

First, reference will be made to FIGS. 1 and 2. FIG. 1 is a view illustrating an external appearance of an image processing apparatus according to an embodiment of the present disclosure. FIG. 2 is a view illustrating a hardware configuration of the image processing apparatus in FIG. 1.

As an example, the image processing apparatus 1 is an apparatus in which functions of a multi-function peripheral (MFP), that is, copy, network printing, a scanner, a FAX, a document server, and the like are integrated. The image processing apparatus 1 includes an operation panel 11, a scanner device 13, a printer device 14, a finisher device 15 that performs processing such as stapling and punching, a communication interface 16, a document feeder 17, a paper feeding device 18, a central processing unit (CPU) 20, a read only memory (ROM) 21, a random access memory (RAM) 22, a data storage unit 23, and a card read writer 23A.

The operation panel 11 includes an operating device 11a and a display 11b.

The operating device 11a includes a plurality of keys which are used to input a digit, a character, a symbol, and the like, a comment key that is pressed to write a document, a sensor that recognizes a plurality of keys which are pressed, and a transmission circuit that transmits a signal indicating a key that is recognized to the CPU 20.

The display 11b displays a screen that provides a message or an instruction, a screen that is used by a user to input setting contents and processing contents, a screen that shows an image formed by the image processing apparatus 1, and processing results.

The display 11b may be a touch panel. That is, the display 11b and at least a part of the operating device 11a may be constituted integrally with each other. The display 11b may have a function of detecting a position on the touch panel with which a finger of a user comes into contact, and transmitting a signal indicating a detection result to the CPU 20.

The image processing apparatus 1 can communicate with an external device (for example, a personal computer (PC) 2 to be described later with reference to FIG. 3) through the communication interface 16. An application program that gives a command to the image processing apparatus 1 and a driver may be installed in the external device. According to this, a user may remotely operate the image processing apparatus 1 by using the external device (PC 2).

The scanner device 13 electro-optically reads out image information such as a photograph, a character, and a figure from the original document to acquire image data. The image data (concentration data) that is acquired is converted into digital data, in an image processing unit (not illustrated in the (halving), and is subjected to various kinds of known image processing. Then, the resultant digital data is transmitted to the printer device 14 or the communication interface 16, and is stored in the storage unit 23 to be provided for image printing or data transmission or to be subsequently used.

The printer device 14 prints image data that is acquired by the scanner device 13, image data that is received from an external device by the communication interface 16, or an image that is stored in the storage unit 23 on a recording sheet such as paper, a film, and the like. The paper feeding device 18 is provided on a lower side of a main body of the image processing apparatus 1, and is used to feed a recording sheet, which is suitable for an image that is a printing target, to the printer device 14. The recording sheet on which air image is printed by the printer device 14, that is, a printed matter is subjected to processing such as stapling and punching through the finisher device 15 in correspondence with a mode setting, and the resultant printed matter is ejected to a tray 24.

The communication interface 16 is a device that includes a transmitter and a receiver, and performs data exchange with a PC and a FAX terminal. As an example of the communication interface 16, a network interface card (NIC), a modem, a terminal adapter (TA), and the like can be used.

The CPU 20 collectively controls the entirety of the image processing apparatus 1, and performs the following operation in this embodiment in addition to an operation of allowing basic functions such as a copy function, a printer function, a scanning function, and a facsimile function. Specifically, the CPU 20 detects a word representing at least any one among a behavior, a sensation, an impression, and a state from characters, which are input by a user, on a character input screen displayed on the display 11*b* of the operation panel 11, or detects a current state of the image processing apparatus 1, that is, when a user is performing an operation. In addition, the CPU 20 performs an operation of extracting a document candidate that is correlated with a word and a device state, which are detected, among a plurality of document candidates, but details thereof will be described later.

The ROM 21 is a memory that stores an operation program of the CPU 20 and the like.

The RAM 22 is a memory that provides a work region when the CPU 20 operates on the basis of the operation program, and the CPU 20 loads the operation program and a plurality of pieces of data from the ROM 21 and the like, and performs work.

For example, the storage unit 23 is constituted by a non-volatile storage device such as a hard disk drive (HDD), and, stores various applications, image data of the original document that is read out by the scanner device 13, and the like.

The card read writer 23A reads out data from a memory card 23X such as a compact flash (registered trademark) or a smart media, or writes the data in the memory card 23X. The memory card 23X is an example of a recording medium that is detachable from the main body of the image processing apparatus 1, and can be used for mainly information exchange with an external device without through a communication line, or for data backup. The CPU 20 may execute a program stored in the memory card 23X to realize processing illustrated in the present disclosure.

Next, reference will be made to FIG. 3. FIG. 3 is a view illustrating a functional configuration of the image processing apparatus 1.

The image processing apparatus 1 includes a scanning unit 521 and a scanning data processing unit 522 with regard, to scanning of the original document. The scanning unit 521 is realized, for example, by the scanner device 13, and reads out an image of the original document. The scanning data processing unit 522 is realized, for example, by the CPU 20, and generates data of an image that is read out by the scanner device 13. The generated image data is stored in a page buffer memory 541. The page buffer memory 541 is realized, for example, by the RAM 22 or the storage unit 23.

The image processing apparatus 1 includes an RIP processing unit 511, an RIP buffer memory 512, and a print processing unit 513 with regard to generation of RIP data. The RIP processing unit 511 and the print processing unit 513 are realized, for example, by the CPU 20. The RIP buffer memory 512 is realized, for example, by the RAM 22 or the storage unit 23.

The RIP processing unit 511 generates data in a raster form from image data in a vector form which is included in print job data transmitted from the PC 2. The data generation includes data conversion from the vector form into the raster form. In an embodiment, the RIP processing unit 511 determines whether or not the above data conversion is necessary for each band (RIP band to be described later) in a predetermined size in image data. In a case where it is determined the data conversion is necessary, the RIP processing, unit 511 executes data conversion with respect to a band that is determined as a band for which data conversion is necessary, and does not execute data conversion with respect to a band that is determined as a band for which data conversion is not necessary. Examples of the band that is determined as a band for which conversion is necessary include a band that includes printing data (in a case of monochrome printing, black color data). Examples of the band that is determined as a band for which conversion is not necessary include a band that does not include printing data. The RIP processing unit 511 stores the generated image data in the raster form in the RIP buffer memory 512.

The print processing unit 513 executes processing such as conversion into one bit with respect to image data stored in the RIP buffer memory 512, and then stores the resultant image data after the processing ire the page buffer memory 541.

The image processing apparatus t includes a detection processing unit 531 that is configured to execute detection processing with respect to image data that is stored in the RIP buffer memory 512. The detection processing unit 531 is realized, for example, by the CPU 20. The detection processing includes determination (pattern recognition) as to whether an image correlated with the image data stored in the RIP buffer memory 512 includes a pattern corresponding to a print-prohibited image such as paper money.

The CPU 20 performs pre-processing with respect to the image data stored in the RIP buffer memory 512 as necessary, and transmits the resultant image data to the detection processing unit 531. Contents of the pre-processing will be described later with reference to drawings after FIG. 10.

The detection processing unit 531 executes detection processing with respect to an image for each predetermined band (DET band to be described later). When determining that the image includes the above-described pattern, the detection processing unit 531 executes specific processing. As an example of the specific processing, the detection processing unit 531 gives an instruction for the print engine 553 described later not to perform a print job including the image. As another example, the detection processing unit 531 gives an instruction for deletion of print job data that includes the image stored in the page buffer memory 541.

The image processing apparatus 1 includes the print engine 553, and elements (print processing unit 551 and an inter-print color (PC) delay processing unit 552) which are synchronized with the print engine 553. The print engine 553 is realized, for example, by the printer device 14. The print processing unit 551 and the inter-PC delay processing unit 552 are realized, for example, by the CPU 20.

The print processing unit 551 executes processing such as data conversion from an RGB-system into a CMY-system with respect to data stored in the page buffer memory 541. The inter-PC delay processing unit 552 executes processing of adjusting (delaying) output timing with respect to image data of each color of CMYK as necessary.

The print engine 553 executes, as a printing job, printing of the image data that is processed in the print processing unit 551 and the inter-PC delay processing unit 552. The print engine 553 executes a print operation (image forming operation) in correspondence with print permission issued from the detection processing unit 531 with respect to the print job received from the PC 2. When receiving a print-prohibiting instruction from the detection processing unit 531, the print engine 553 does not execute a print operation of the print job that is set as a target of the prohibition.

[2. RIP Data Generating Process and Configuration]

Description will be given of an RIP data generation process with reference to FIGS. 4 to 7. FIGS. 4 to 7 are views illustrating the RIP data generating process. RIP data is an example of image data in the raster form which is generated through conversion of image data in the raster form which is transmitted from the PC 2 and the like.

Figure 4:
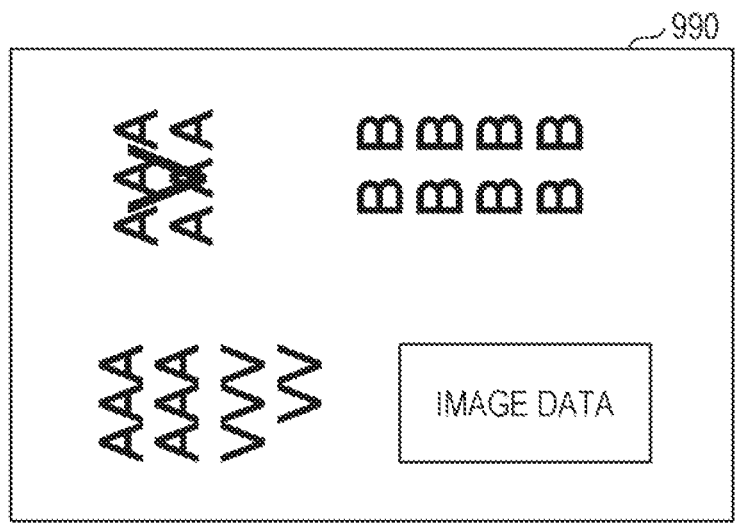
FIG. 4 is a view illustrating an RIP data generating process.
Figure 5:
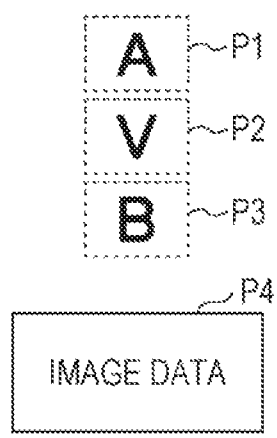
FIG. 5 is a view illustrating the RIP data generating process.
Figure 6:
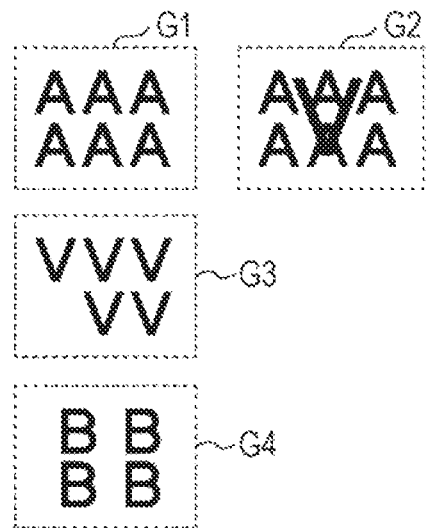
FIG. 6 is a view illustrating the RIP data generating process.

FIG. 4 illustrates an example of an image 990 of the original document. FIG. 5 illustrates image parts P1, P2, and P3 which are reproduced from data (data in a vector form) of a print destination language (PDL) corresponding to the original document. The RIP processing unit 511 forms an image block by using the image parts reproduced from the print destination language, disposition information of the parts, overlap notation information, and the like. FIG. 6 illustrates image blocks G1, G2, G3, and G4.

The RIP processing unit 511 reproduces an image by disposing generated image block on the basis of disposition information on the original document. The RIP processing unit 511 outputs RIP data corresponding to the reproduced image to the RIP buffer memory 512 in a band unit having a predetermined size. The RIP data output unit by the RIP processing unit 511 is referred to as "RIP band".

Figure 7:
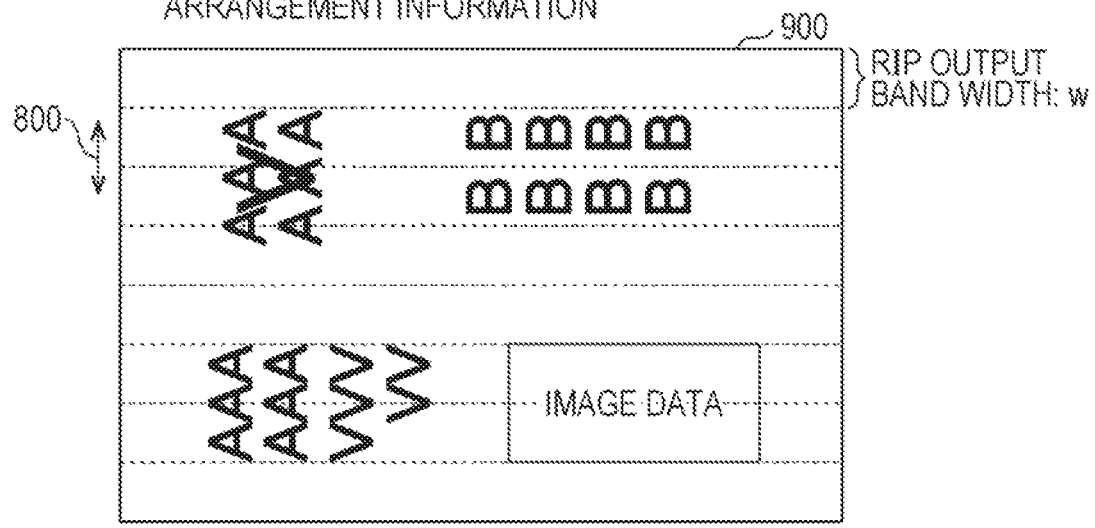
FIG. 7 is a view illustrating the RIP data generating process.

FIG. 7 is a view illustrating a relationship between the reproduced image and the RIP band. A plurality of broken lines are drawn in an image 900. Each of the respective regions (eight regions) divided by the broken lines corresponds to one RIP band. The RIP band can be referred to as a band having a width w in a direction in which the reproduced image 900 is indicated by a double-headed arrow 800.

[3. Selection of Detection Processing Target in RIP Data]

In the image processing apparatus 1 according to the present disclosure, the CPU 20 can exclude (remove) a band, which does not include printing data, among RIP bands from a detection processing target. The print engine 553 executes a print job transmitted from the PC 2 in accordance with print permission from the detection processing unit 531. Since the number of RIP bands which become the detection processing target decreases, it is possible to avoid a situation in which initiation of a print operation is delayed in the print engine 553 due to waiting of termination of the detection processing.

Figure 8:
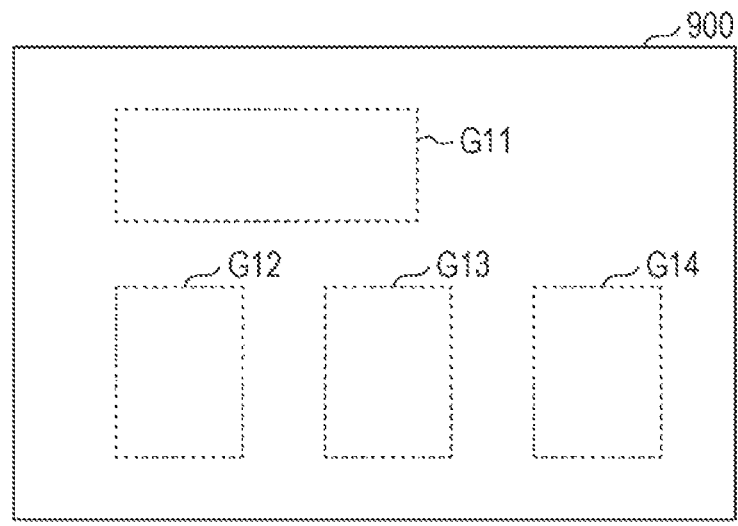
FIG. 8 is a view illustrating selection of a detection processing target portion in the RIP data.
Figure 9:
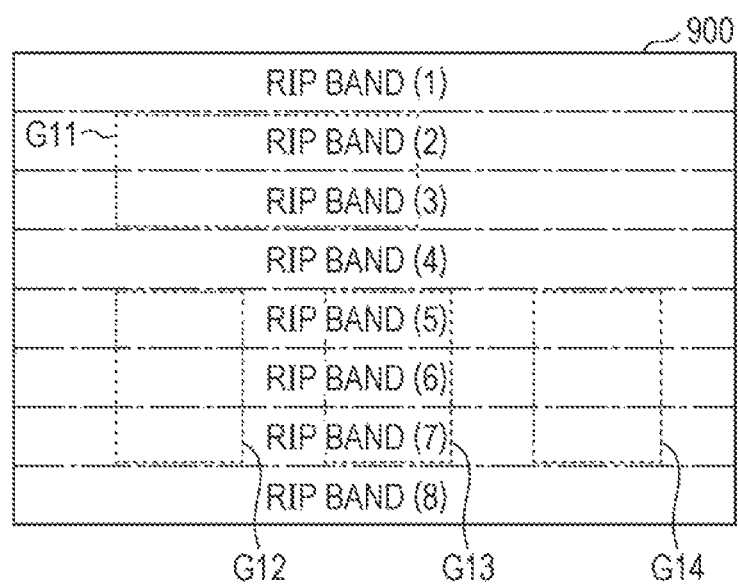
FIG. 9 is a view illustrating selection of the detection processing target portion in the RIP data.
Figure 10:
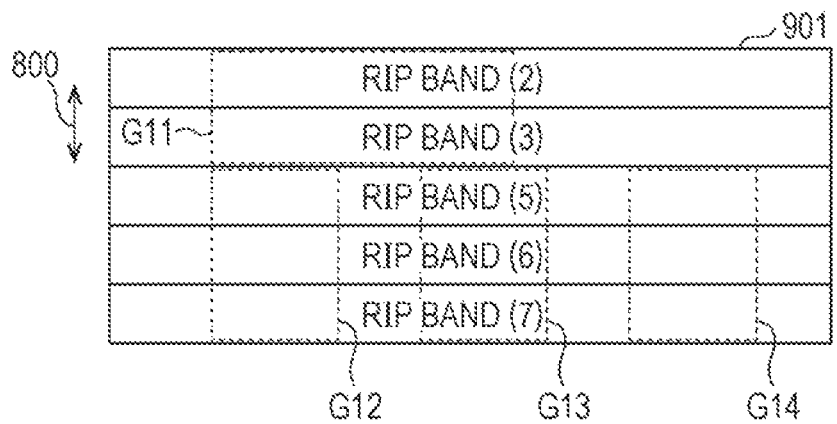
FIG. 10 is a view illustrating selection of the detection processing target portion in the RIP data.

Description will be given of selection of detection processing target portion from the RIP data with reference to FIGS. 8 to 10. FIGS. 8 to 10 are views illustrating selection of the detection processing target portion from the RIP data.

FIG. 8 illustrates an example of a print image (image reproduced by the RIP processing unit 511). The image 900 in FIG. 8 includes four regions G11 to G14 including printing data. In the example illustrated in FIG. 8, the image 900 does not include printing data at a portion other than the regions G11 to G14.

FIG. 9 illustrates a configuration of an RIP band in the image 900 illustrated in FIG. 8. As illustrated in FIG. 9, the image 900 illustrated in FIG. 8 includes eight RIP bands (1) to (8).

Printing data is not included in three RIP bands (1), (4), and (8) among the RIP bands (1) to (8) illustrated. In FIG. 9. In this case, the CPU 20 can exclude (remove) the RIP bands (1), (4), and (8) from the detection processing target in the detection processing unit 531.

FIG. 10 illustrates RIP bands which are set as the detection processing target in the image 900 in FIG. 8. As illustrated in FIG. 10, the CPU 20 may set only the RIP bands (2), (3), and (5) to (7), which include printing data, among RIP bands (1) to (8) as the detection processing target.

The CPU 20 may perform reconstruction to exclude an image reproduced by the RIP processing unit 511 from the detection processing target. In this case, in an image 901 in FIG. 10, the remaining RIP bands which are set as the detection processing target, are linked to each other in a direction of a double-headed arrow 800. According to this, the RIP band (3) and the RIP band (5), which are separated from each other in the image 900 in FIGS. 8 and 9, are linked to each other.

[4. Addition of White Image for Detection Processing]

Figure 11:
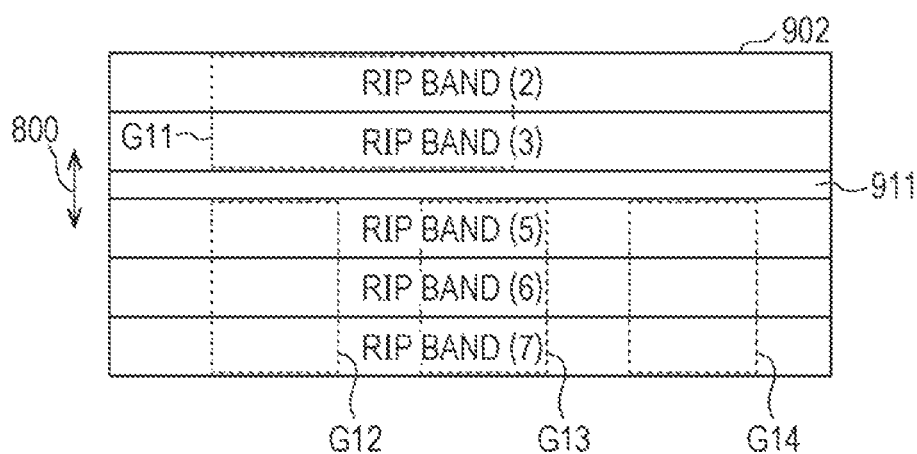
FIG. 11 is a view illustrating addition of white image data.

Description will be given of addition of white image data to data including two or more RIP bands for the detection processing with reference to FIGS. 11 to 26. FIG. 11 is a view illustrating an example of an aspect of white image addition. FIGS. 12 to 26 are views illustrating aspects of erroneous detection that is assumed due to linking of the RIP bands as illustrated in FIG. 10.

FIG. 11 illustrates an image 902 obtained by adding a white image to the image 901 in FIG. 10. The CPU 20 adds a white image to a boundary portion between two RIP bands which are linked to each other in the image 901 through deletion of the RIP band (4). In the image 902 in FIG. 11, a white image 911 is added between the RIP band (3) and the RIP band (5).

As described above with reference to FIG. 10, RIP bands, which are separated from each other in the original image (image 900), can be linked through deletion of an RIP band that is excluded from the detection processing target. Through the linking, an image pattern, which becomes a print-prohibited target in detection processing, may be formed. According to this, even though the image 900 does not include an image pattern that becomes the print-prohibited target, when the image pattern is detected in the detection processing, printing of the image 900 may be prohibited.

When the white image 911 is added as illustrated in FIG. 11, the CPU 20 detects the image pattern in detection processing with respect to the image 900 that does not include an image pattern that becomes the print-prohibited target, and thus it is possible to avoid erroneous detection. Specific examples of the erroneous detection will be described with reference to FIGS. 12 to 26.

First Example

Figure 12:
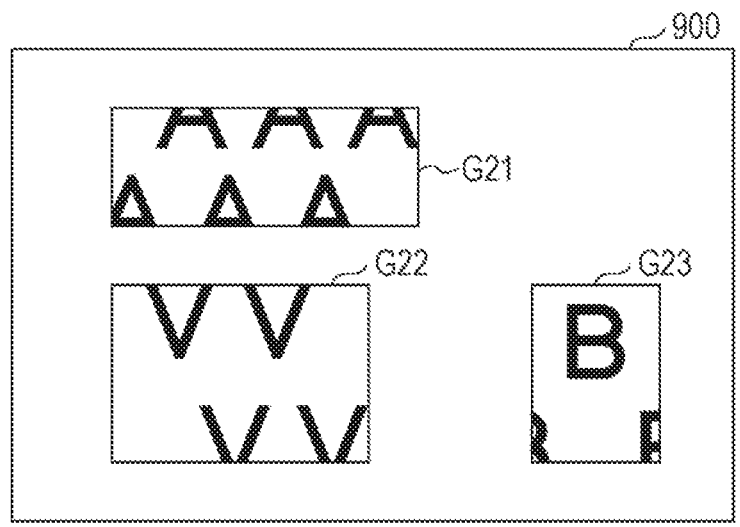
FIG. 12 is a view illustrating an aspect of erroneous detection due to linking of RIP bands.

FIGS. 12 to 16 are views illustrating a first example of the erroneous detection. FIG. 12 illustrates an example of an image that is reproduced by the RIP processing unit 511. An image 900 in FIG. 12 includes three regions G21, G22, and G23 which include printing data.

Figure 13:
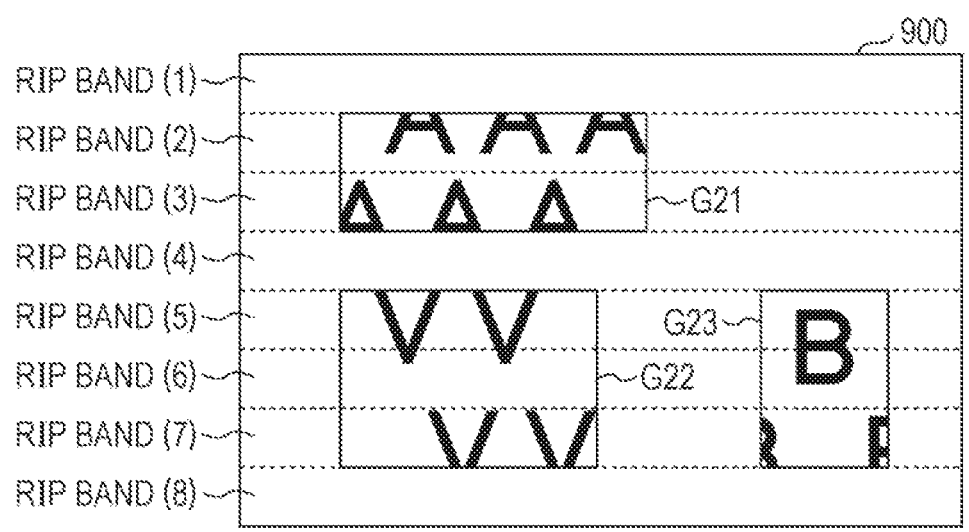
FIG. 13 is a view illustrating an aspect of erroneous detection due to linking of the RIP bands.

FIG. 13 illustrates eight RIP bands (1) to (8) which are included in the image 900 in FIG. 12. In an example illustrated in FIG. 13, the RIP bands (1), (4), and (8) do not include printing data.

Figure 14:
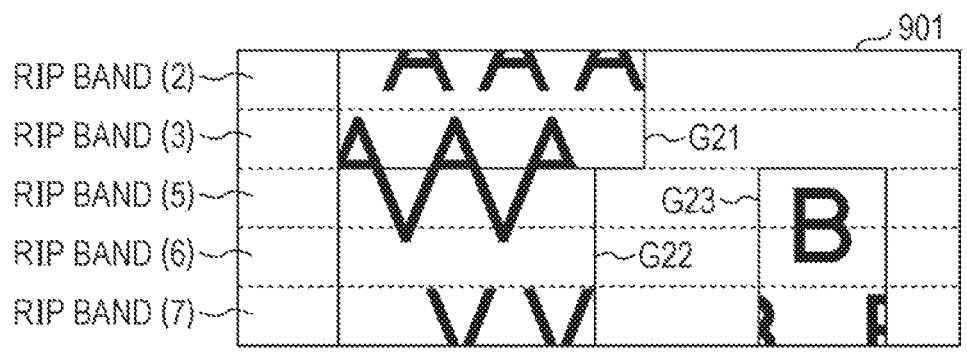
FIG. 14 is a view illustrating an aspect of erroneous detection due to linking of the RIP bands.

FIG. 14 illustrates an image 901 in which the RIP bands (1), (4), and (8) which do not include printing data, are deleted from the image 900 in FIG. 13. In the image 901 in FIG. 14, the RIP band (3) and the RIP band (5), which are not linked to each other in FIG. 13, are linked to each other. According to this, an image of the region G21 and an image of the region G22 are linked to each other.

Figure 15:
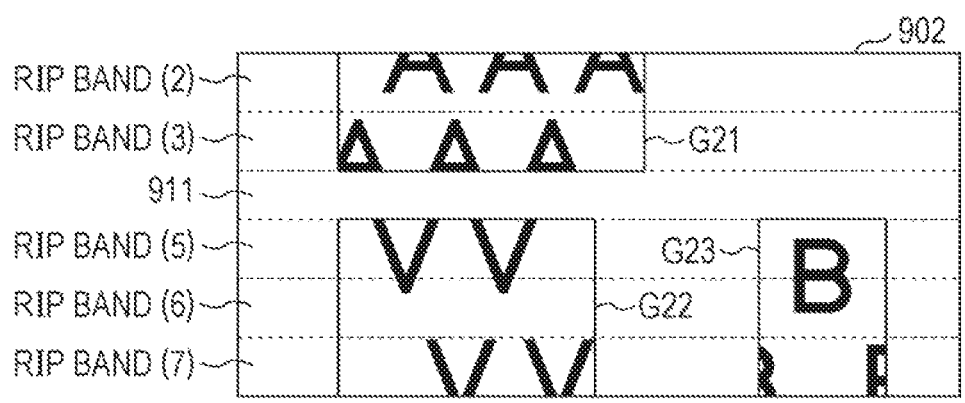
FIG. 15 is a view illustrating an aspect of erroneous detection due to linking of the RIP bands.

FIG. 15 illustrates an image 902 in which a white image 911 is added between the RIP band (3) and the RIP band (5) in the image 901 in FIG. 14.

Figure 16:
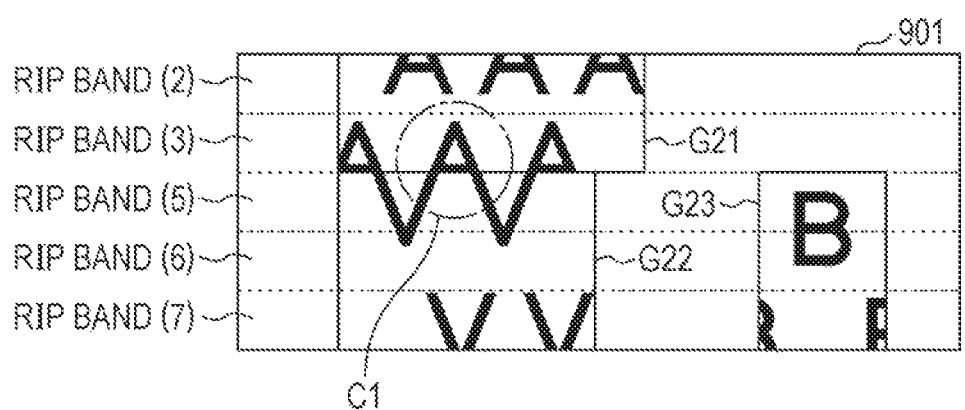
FIG. 16 is a view illustrating an aspect of erroneous detection due to linking of the RIP bands.

FIG. 16 illustrates a specific example of erroneous detection which may occur when the image 901 in FIG. 14 becomes a detection processing target. A circle C1 in FIG. 16 indicates a portion of the image 901. The portion indicated by the circle C1 includes a shape that is seen as a character "A". The portion indicated by the circle C1 is not included in the image 900. The portion is generated when the RIP band (3) and the RIP band (5) in the image 901 are linked to each other.

In a case where the character "A" is included in a pattern of a print-prohibited target in detection processing, even though the image 900 does not include the character "A", since the image 901 includes a character, printing of the image 900 may be prohibited. On the other hand, since the white image 911 is added between the RIP band (3) and, the RIP band (5), the image 902 in FIG. 15 does not include a portion including the character "A".

As described above, since the CPU 20 not only simply deletes RIP bands which do not include printing data as illustrated in FIG. 14, but also adds the white image to a boundary between RIP bands which are linked to each other through the deletion as illustrated in FIG. 15, it is possible to suppress erroneous detection while reducing the amount of images which become a detection processing target.

Second Example

Figure 17:
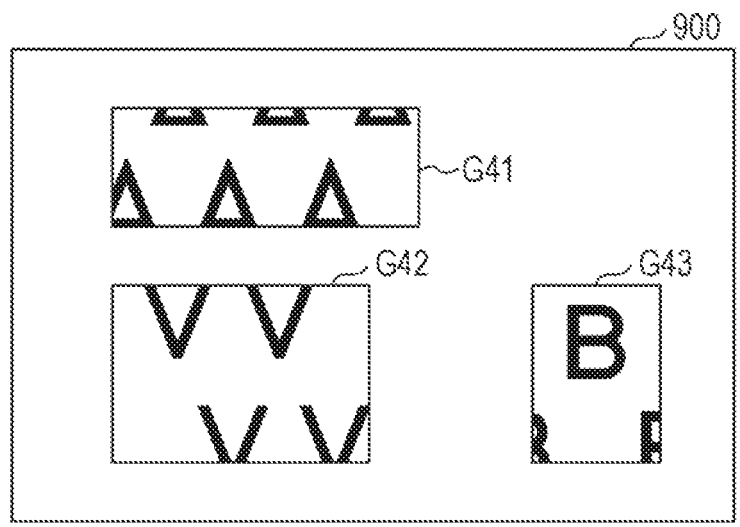
FIG. 17 is a view illustrating an aspect of erroneous detection due to linking of the RIP bands.

FIGS. 17 to 21 are views illustrating a second example of erroneous detection. FIG. 17 illustrates an example of an image that is reproduced by the RIP processing unit 511. An image 900 in FIG. 17 includes three regions G41, G42, and G43 which include printing data.

Figure 18:
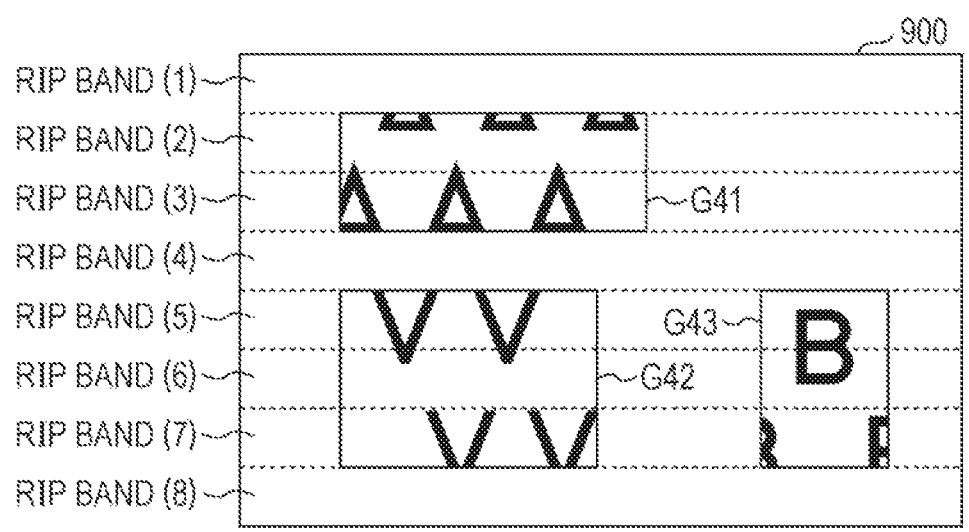
FIG. 18 is a view illustrating an aspect of erroneous detection due to linking of the RIP bands.

FIG. 18 illustrates eight RIP bands (1) to (8) which are included in the image 900 in FIG. 17. In the example in FIG. 18, the RIP bands (1), (4), and (8) do not include printing data.

Figure 19:
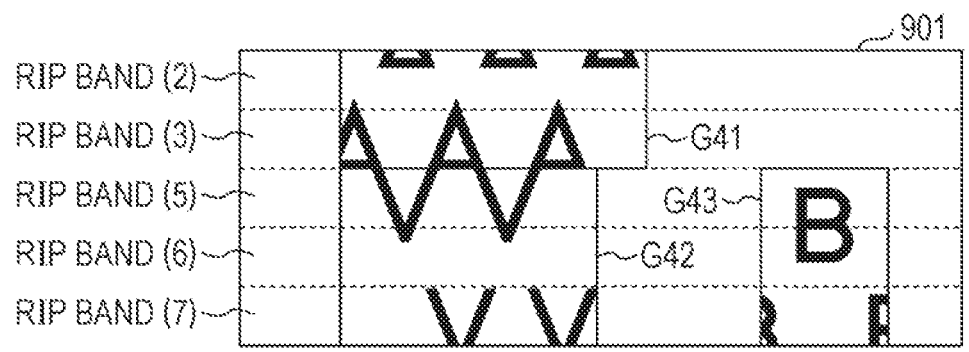
FIG. 19 is a view illustrating an aspect of erroneous detection due to linking of the RIP bands.

FIG. 19 illustrates an image 901 in which the RIP bands (1), (4), and (8) which do not include printing data are deleted from the image 900 in FIG. 18. In the image 901 in FIG. 19, the RIP band (3) and the RIP band (5), which are not linked to each other in FIG. 18, are linked to each other. According to this, an image of the region G41 and an image of the region G42 are linked to each other.

Figure 20:
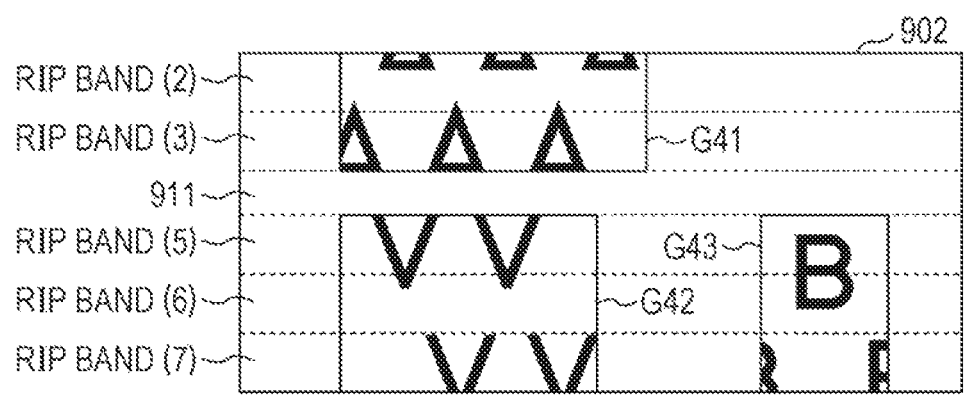
FIG. 20 is a view illustrating an aspect of erroneous detection due to linking of the RIP bands.

FIG. 20 illustrates an image 902 in which a white image 911 is added between the RIP band (3) and the RIP band (5) in the image 901 in FIG. 19.

Figure 21:
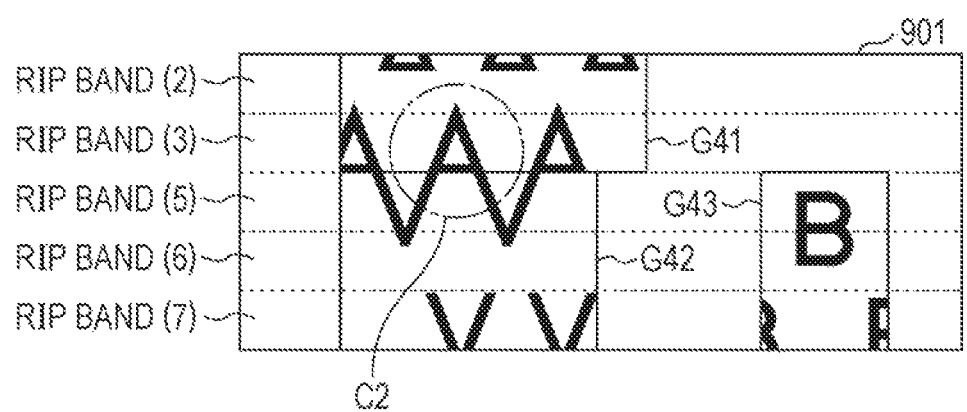
FIG. 21 is a view illustrating an aspect of erroneous detection due to linking of the RIP bands.

FIG. 21 illustrates a specific example of erroneous detection which may occur when the image 901 in FIG. 19 becomes a detection processing target. A circle C2 in FIG. 21 indicates a portion of the image 901. The portion indicated by the circle C2 includes a shape that is seen as a character "A". The portion indicated by the circle C2 is not included in the image 900. The portion is generated when the RIP band (3) and the RIP band (5) in the image 901 are linked to each other. A phenomenon in which a meaningful image (character A) is formed due to linking of the RIP band (3) and the RIP band (5) may be referred to as "interference" between RIP bands.

In a case where the character "A" is included in a pattern of a print-prohibited target in detection processing, even though the image 900 does not include the character "A", since the image 901 includes a character, printing of the image 900 may be prohibited. On the other hand, since the white image 911 is added between the RIP band (3) and the RIP band (5), the image 902 in FIG. 20 does not include a portion including the character "A".

As described above, since the CPU 20 not only simply deletes RIP bands which do not include printing data as illustrated in FIG. 19, but also adds the white image to a boundary between RIP bands which are linked to each other through the deletion as illustrated in FIG. 20, it is possible to suppress erroneous detection while reducing the amount of images which become a detection processing target.

Third Example

Figure 22:
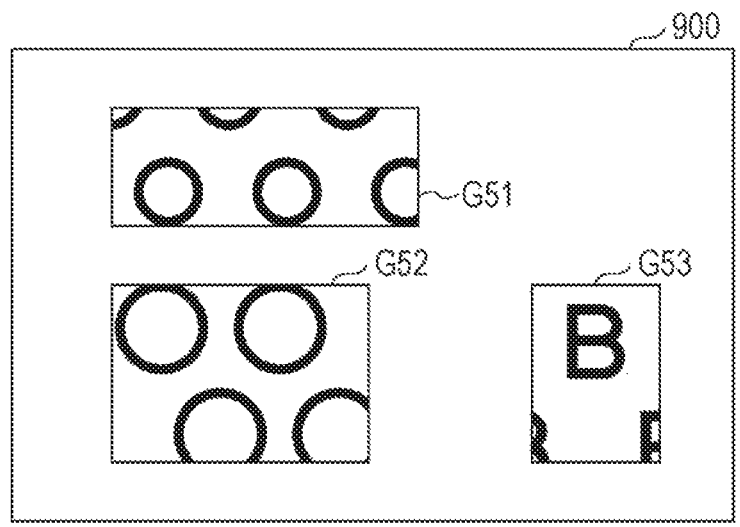
FIG. 22 is a view illustrating an aspect of erroneous detection due to linking of the RIP bands.

FIGS. 22 to 26 are views illustrating a third example of erroneous detection. FIG. 22 illustrates an example of an image that is reproduced by the RIP processing unit 511. An image 900 in FIG. 22 includes three regions G51, G52, and G53 which include printing data.

Figure 23:
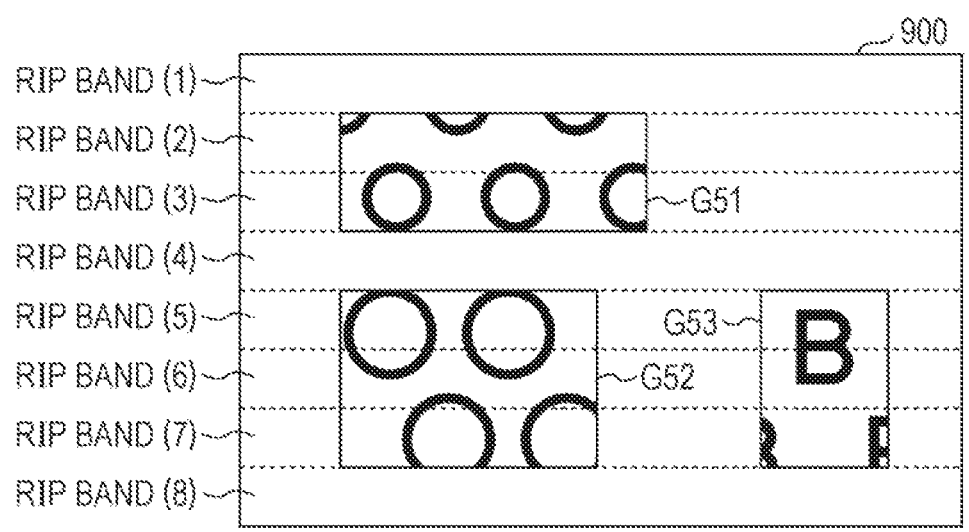
FIG. 23 is a view illustrating an aspect of erroneous detection due to linking of the RIP bands.

FIG. 23 illustrates eight RIP bands (1) to (8) which are included in the image 900 in FIG. 22. In the example in FIG. 23, the RIP bands (1), (4), and (8) do not include printing data.

Figure 24:
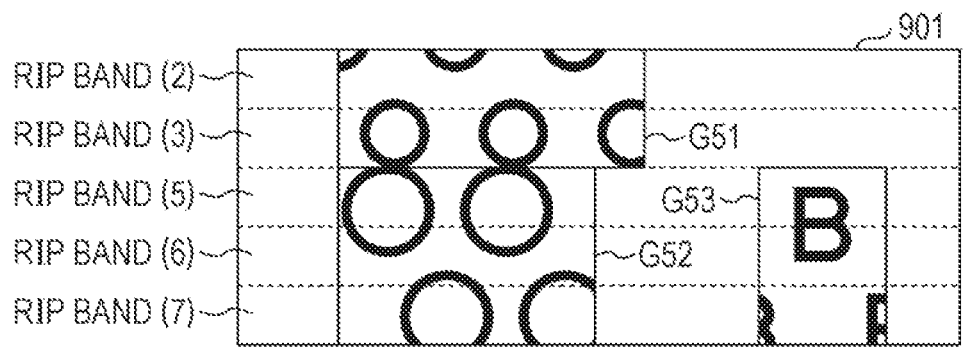
FIG. 24 is a view illustrating an aspect of erroneous detection due to linking of the RIP bands.

FIG. 24 illustrates an image 901 in which the RIP bands (1), (4), and (8) which do not include printing data are deleted from the image 900 in FIG. 23. In the image 901 in FIG. 24, the RIP band (3) and the RIP band (5), which are not linked to each other in FIG. 23, are linked to each other. According to this, an image of the region G51 and an image of the region G52 are linked to each other.

Figure 25:
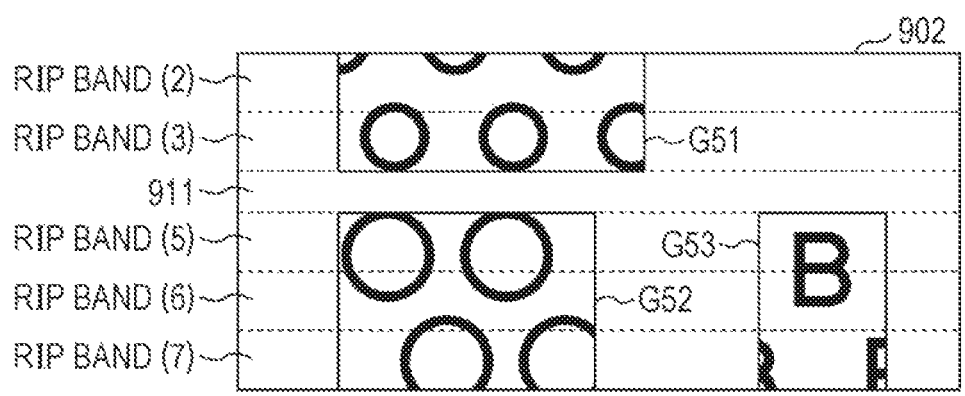
FIG. 25 is a view illustrating an aspect of erroneous detection due to linking of the RIP bands.

FIG. 25 illustrates an image 902 in which a white image 911 is added between the RIP band (3) and the RIP band (5) in the image 901 in FIG. 24.

Figure 26:
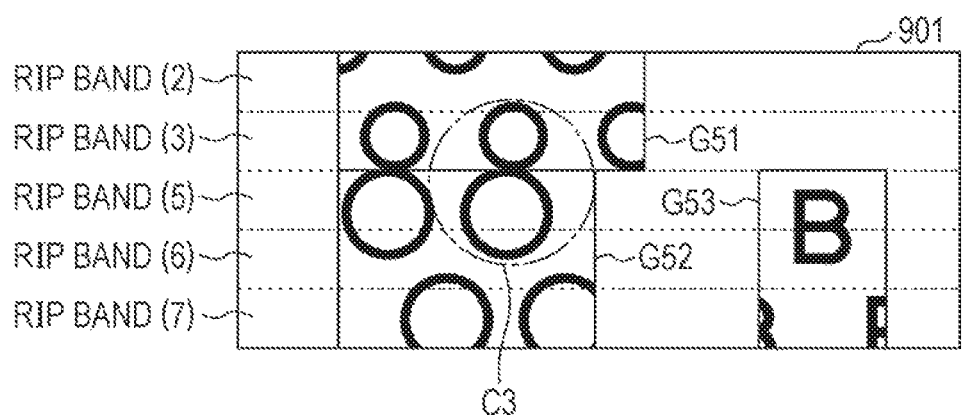
FIG. 26 is a view illustrating an aspect of erroneous detection due to linking of the RIP bands.

FIG. 26 illustrates a specific example of erroneous detection which may occur when the image 901 in FIG. 24 becomes a detection processing target. A circle C3 in FIG. 26 indicates a portion of the image 901. The portion indicated by the circle C3 includes a shape that is seen as a character "8". The portion indicated by the circle C3 is not included in the image 900. The portion is generated when the RIP band (3) and the RIP band (5) in the image 901 are linked to each other.

In a case where the character "8" is included in a pattern of a print-prohibited target in detection processing, even though the image 900 does not include the character "8", since the image 901 includes a character, printing of the image 900 may be prohibited. On the other hand, since the white image 911 is added between the RIP band (3) and the RIP band (5), the image 902 in FIG. 25 does not include a portion including the character "8".

As described above, since the CPU 20 not only simply deletes RIP bands which do not include printing data as illustrated in FIG. 24, but also adds the white image to a boundary between RIP bands which are linked to each other through the deletion as illustrated in FIG. 25, it is possible to suppress erroneous detection while reducing the amount of images which become a detection processing target.

[5. Generation of Image for Detection Processing]

Description will be given of generation of an image that becomes a detection processing target in the detection processing unit 531 with reference to FIGS. 27 to 31. In an embodiment, generation of the image that becomes the detection processing target includes addition of a margin to an image reproduced as RIP data, deletion of an RIP band that does not include printing data, and addition of the white image (white image 911) as illustrated with reference to FIG. 11 and the like. Addition of the margin grill be described mainly with reference to FIGS. 27 to 29. Deletion of the RIP band that does not include printing data will be described mainly with reference to FIG. 30, Addition of the white image will be described mainly with reference to FIG. 31.

(Addition of Margin)

Figure 27:
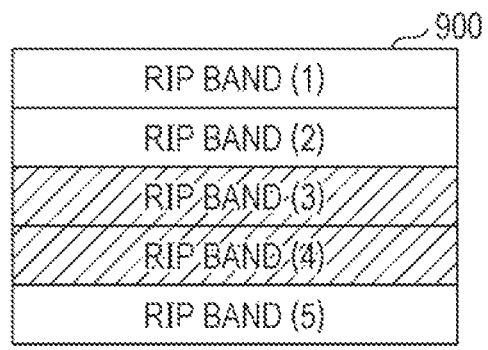
FIG. 27 is a view illustrating generation of an image that becomes a detection processing target.

FIG. 27 illustrates an image 900 that is generated when data in a vector form from PC 2 is reproduced in the RIP processing unit 511. In an example in FIG. 27, an image 900 includes RIP bands (1) to (5).

Figure 28:
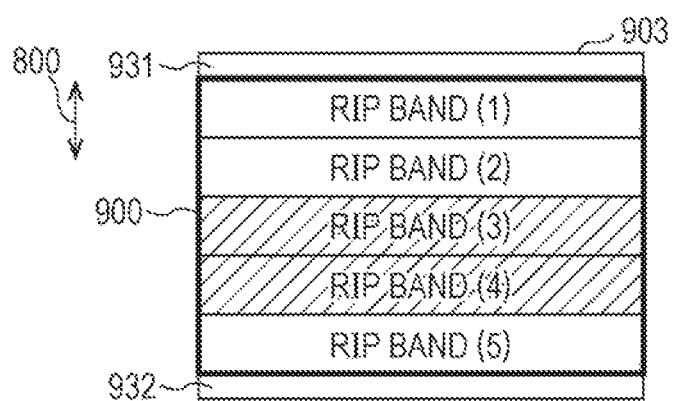
FIG. 28 is a view illustrating generation of an image that becomes the detection processing target.

FIG. 28 illustrates an image 903 obtained by adding margins 931 and 932 in the image 900 in FIG. 27. The margin 931 is added to one side of the image 900 in a direction indicated by a double-headed arrow 800. The margin 932 is added to the other side of the image 900 in the direction indicated by the double-headed arrow 800. For example, the margins 931 and 932 are white image (image that does not include printing data). In the image processing apparatus 1, an image, which is obtained by adding a margin at both ends of an image reproduced in the RIP processing unit 511, may be set as a detection processing target. According to this, it is possible to perform more accurate detection processing with respect to an image that is reproduced.

Figure 29:
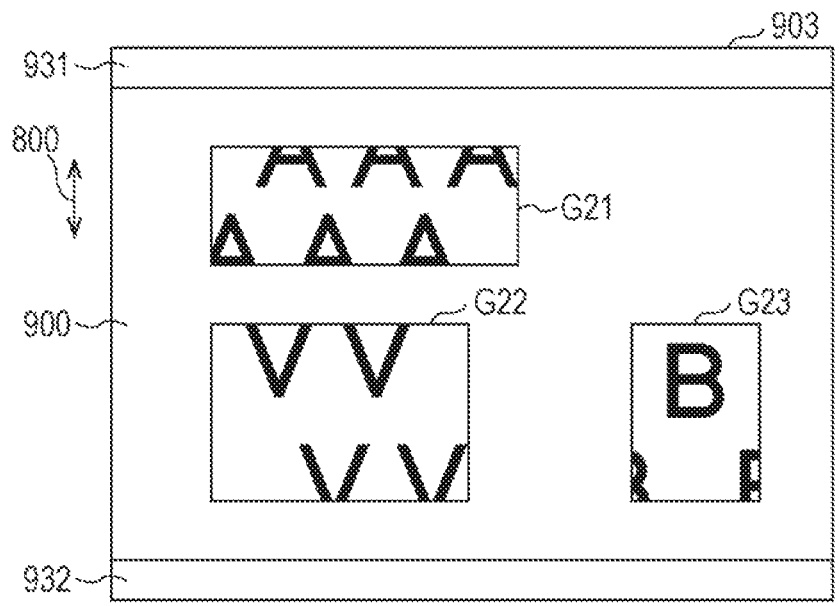
FIG. 29 is a view illustrating generation of an image that becomes the detection processing target.

FIG. 29 illustrates a specific example of the image 900 in FIG. 28 and margins which are added. In an image 903 in FIG. 29, margins 931 and 932 are added to both ends of the image 900 in FIG. 12.

(Deletion of RIP Band that does not Include Printing Data)

Figure 30:
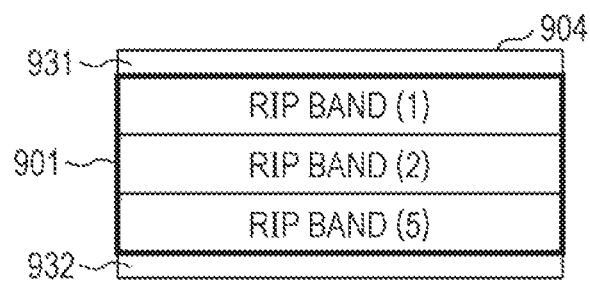
FIG. 30 is a view illustrating generation of an image that becomes the detection processing target.

FIG. 30 illustrates an image 904 in which the RIP bands (3) and (4), which do not include printing data, among the RIP bands (1) to (5) included in the image 903 in FIG. 28 are deleted. In the image 904 in FIG. 30, since the RIP bands (3) and (4) are deleted, the RIP band (2) and the RIP band (5) which are separated from each other in the image 900 in FIG. 27 are linked in a direction indicated by the double-headed arrow 800.

(Addition of White Image)

Figure 31:
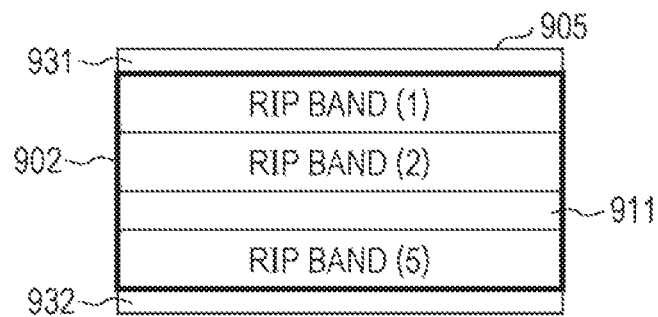
FIG. 31 is a view illustrating generation of an image that becomes the detection processing target.

FIG. 31 illustrates an image 905 obtained by adding a white image 911 to the image 904 illustrated in FIG. 30. The white image 911 is added between the RIP band (2) and the RIP band (5) (which are linked to each other through deletion of the RIP bands (3) and (4) in the image 904).

[6. Effect Due to Using of Image for Detection Processing]

In the image processing apparatus 1, the CPU 20 can exclude (remove) a region, which does not include printing data, in the image 900 from the detection processing target instead of setting the entirety of the image 900 reproduced in the RIP processing unit 511 as the detection processing target. An effect obtained by excluding (removing) a part of the image 900 from the detection processing target will be described with reference to FIGS. 32 and 33.

An execution unit of detection processing in the detection processing unit 531 of the image processing apparatus 1 is referred to as a DET band. Each DET band is a region having a width d in the direction of the double-headed arrow 800. The width d of the DET band and a width w of an RIP band may be the same as each other or different from each other.

FIG. 32 schematically illustrates ranges of nine DET bands (1) to (9) which are set with respect to an image 905 in FIG. 31. In an embodiment, digits applied to DET bands represent the order of processing targets in the detection processing unit 531. That is, in an example in FIG. 32, detection processing targets in the detection processing unit 531 are set in the order of the DET band (1), the DET band (2), the DET band (3), . . . . For convenience, in FIG. 32, the DET bands (1), (3), (5), (7), and (9) are indicated by a solid line (fine line), and the DET bands (2), (4), (6), and (8) are indicated by a one-dot chain line.

In the image processing apparatus 1, in two DET bands adjacent to each other, one DET band shares approximately the half of a region of the other DET hand. For example, the DET band (1) shares approximately the half thereof with the DET band (2) in the direction of the double-headed arrow 800. In this aspect, in order to set the entire regions of the image 905 as a detection processing target, nine DET bands are necessary as illustrated in FIG. 32.

FIG. 33 schematically illustrates ranges of 11 DET bands (1) to (11) which are set with respect to the image 903 in FIG. 28. For convenience, in FIG. 33, the DET bands (1), (3), (5), (7), (9), and (11) are indicated by a solid line (fine line), and the DET bands (2), (4), (6), (8), and (10) are indicated by a one-dot chain line. When arranging the DET bands in an aspect with reference to FIG. 32, when the entire regions of the image 903 are set as a detection processing target, 11 DET bands are necessary as illustrated in FIG. 33.

That is, the number of the DET bands for which the detection processing unit 531 executes detection processing is smaller in a case where the image 905 in FIG. 32 is set as the detection processing target in comparison to a case where the image 903 in FIG. 33 is set as the detection processing target. According to this, time, which is necessary for detection processing of determining whether or not the image 900 includes a print image, can be further shortened in a case where the image 905 in FIG. 32 is set as the target in comparison to a case where the image 903 in FIG. 33 is set as the target.

As described above, the CPU 20 can shorten time necessary for the detection processing by the detection processing unit 531 by performing pre-processing such as deletion of an RIP band that does not include printing data (FIG. 30 and the like) and addition of the white image (FIG. 31 and the like).

[7. Length of White Image that is Added]

Description will be given of a length of an image that is added as the white image 911 in the direction of the double-headed arrow 800 with reference to FIGS. 34 and 35.

Figure 34:
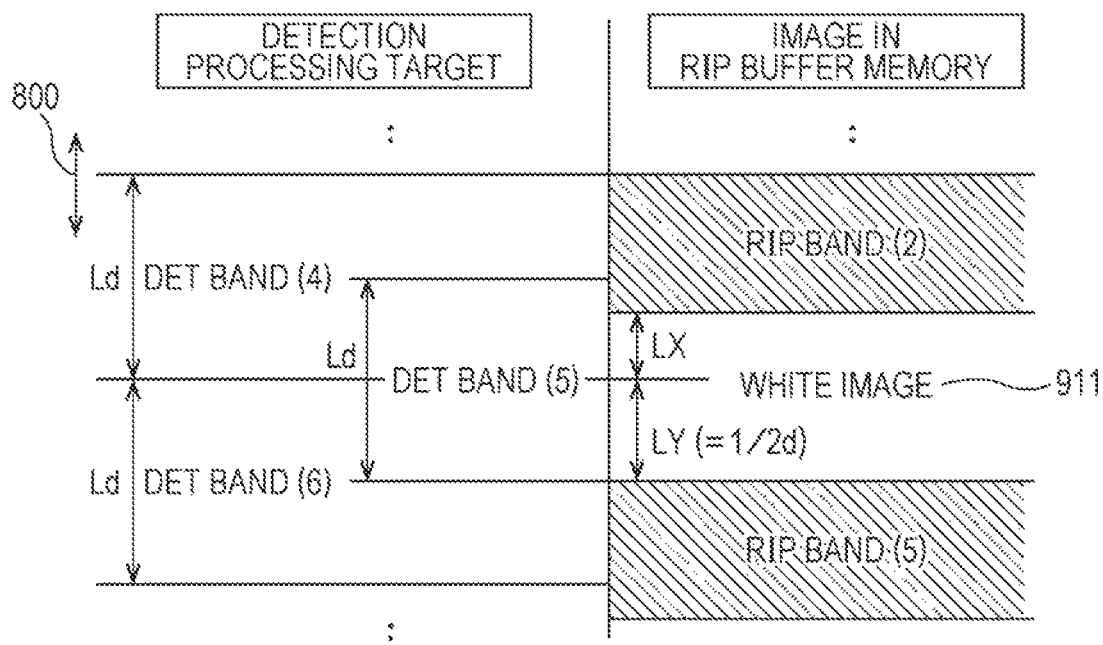
FIG. 34 is a view illustrating a length of an image that is added as a white image.

FIG. 34 is schematically illustrates a relationship between the DET bands (4) to (6) and the RIP bands (2) and (5) in the image 905 in FIG. 32. In an example in FIG. 34, a dimension of the white image 911 in the direction of the double-headed arrow 800 are set so that each of the DET bands does not include an image of two RIP bands which are adjacent to each other through deletion of RIP bands which do not include printing data.

More specifically, the dimension of the white image 911 in the direction of the double-headed arrow 800 is the sum of a length LX and a length LY in FIG. 34.

The length LX is a length from an end of the RIP band (2) to an end of the DET band (4). The CPU 20 can calculate the length LX by using an absolute address of each of the RIP band (2) and the DET band (4).

The length LY is a length that is approximately the half of the width d of the DET band in the direction of the double-headed arrow 800.

Figure 35:
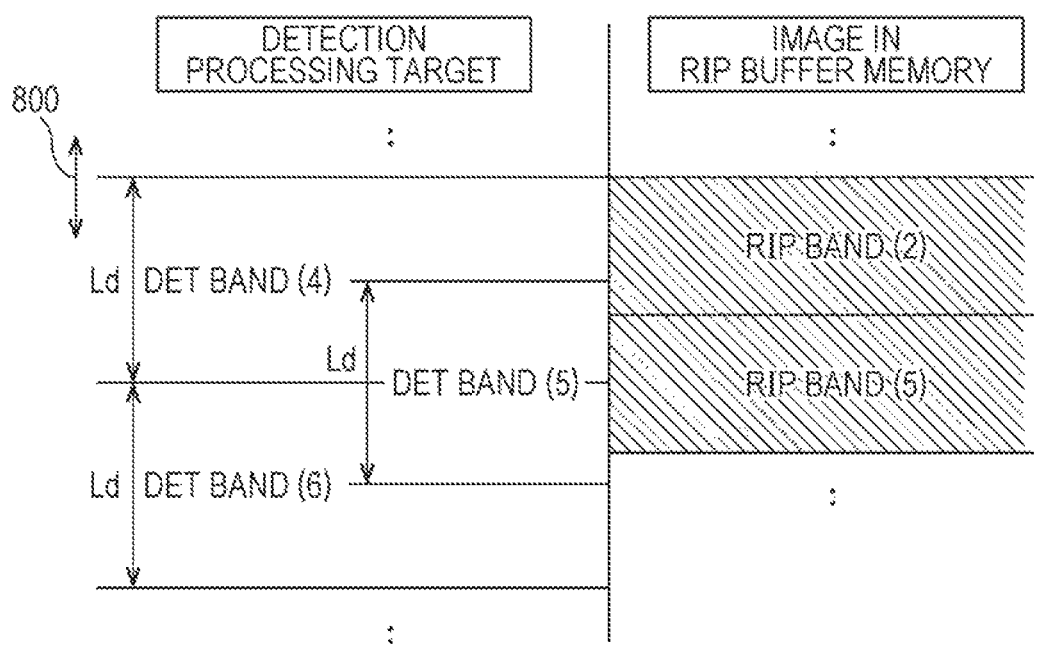
FIG. 35 is a view illustrating the length of the image that is added as the white image.

FIG. 35 is a view illustrating a state before the white image 911 is added. In the state illustrated in FIG. 35, each of the DET band (4) and the DET band (5) corresponds to not only the RIP band (2) but also the RIP band (5) in the direction of the double-headed arrow 800. That is, in the state illustrated in FIG. 35, the DET band (4) and the DET band (5) include images of the RIP band (2) and the RIP band (5). Accordingly, in detection processing of the DET band (4), erroneous detection may occur due to interference between DET bands as described above with reference to FIG. 21 and the like. In addition, even in detection processing of the DET band (5), erroneous detection may occur due to interference between DET bands as described above with reference to FIG. 21 and the like.

On the other hand, in FIG. 34, in any of the DET band (4) and the DET band (5), it is possible to avoid a situation in which both images of two DET bands which are linked to each other are included through deletion of a DET band that does not include printing data. According to this, it is possible to reliably avoid occurrence of erroneous detection due to interference between DET bands as described above with reference to FIG. 21 and the like.

[8. Determination as to Whether or not to Delete (Remove) RIP Data, on Basis of Amount of Data, of Detection Processing Target]

In the image processing apparatus 1, a RIP band, which does not include printing data, is deleted from a detection processing target to shorten time necessary for detection processing in the detection processing unit 531. On the other hand, the length of the white image 911 that is added is influenced by the width (d) of the DET band as described above with reference to FIG. 34.

Accordingly, in a case where the width (w) of the RIP band is very smaller than the width (d) of the DET band, even if the RIP band is deleted, the amount of data may further increase in comparison to the original image due to addition of the white image 911. In this case, time necessary for the detection processing increase on the contrary. In this case, the CPU 20 sets the entirety of the image 900 reproduced from PDL data from the PC 2 and the like as the detection processing target (without deleting (removing) the RIP band).

Description will be given of an example in which the amount of data increases in comparison to the original image due to deletion of the RIP band and addition of the white image 911 with reference to FIGS. 36 to 39.

Figure 36:
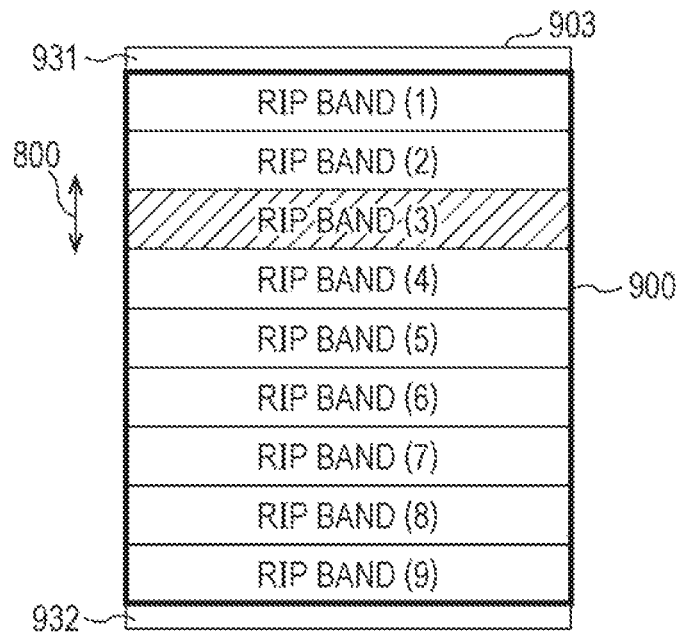
FIG. 36 is a view illustrating an example in which the amount of data further increases in comparison to the original image due to deletion of the RIP band and addition of the white image.

FIG. 36 illustrates an example of an image 903 obtained by adding a margin to the original image (image reproduced by RIP data generated from PDL data) to the original image. In the example in FIG. 36, the original image 900 includes images corresponding to RIP bands (1) to (9). Among the RIP bands (1) to (9), only the RIP band (3) does not include priming data.

Figure 37:
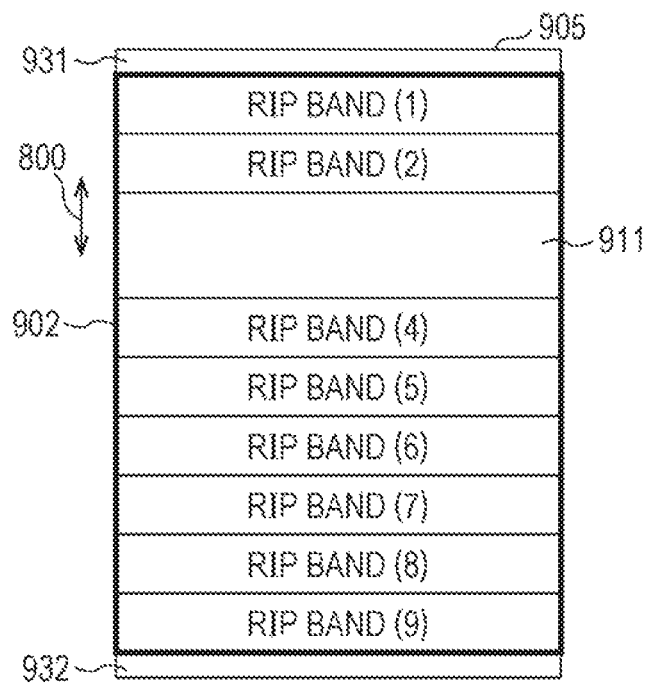
FIG. 37 is a view illustrating an example in which the amount of data further increases in comparison to the original image due to deletion of the RIP band and addition of the white image.

FIG. 37 illustrates an example of an image 905 that is generated by adding a white image 911 after deleting the RIP band (3) in the image 903 in FIG. 36. The white image 911 is longer than the RIP band (3) in a direction of a double-headed arrow 800.

Figure 38:
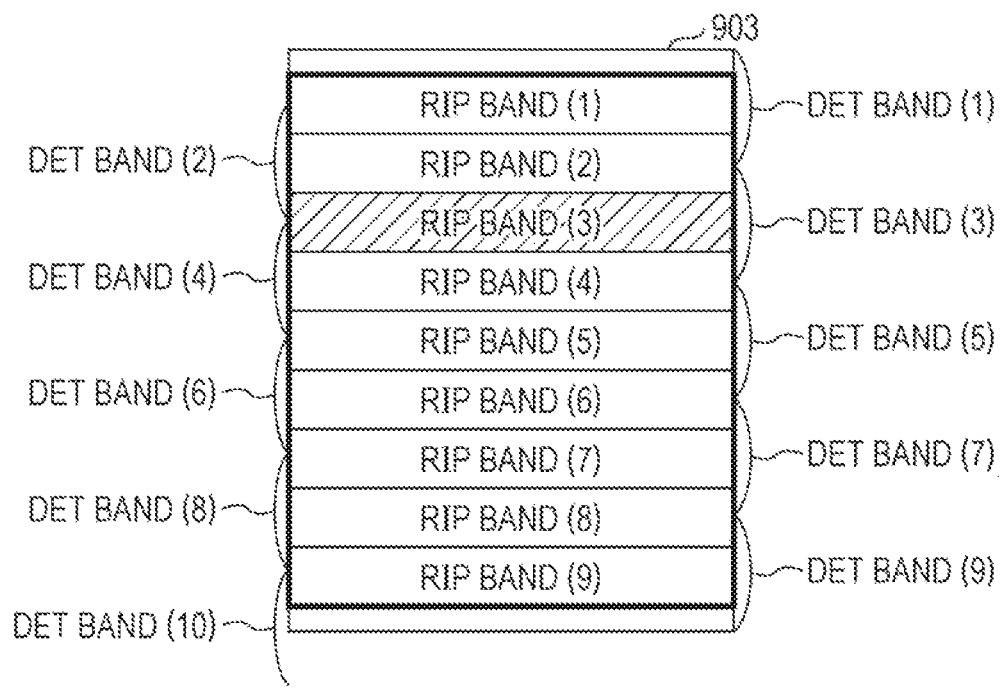
FIG. 38 is a view illustrating an example in which the amount of data further increases in comparison to the original image due to deletion of the RIP band and addition of the white image.
Figure 39:
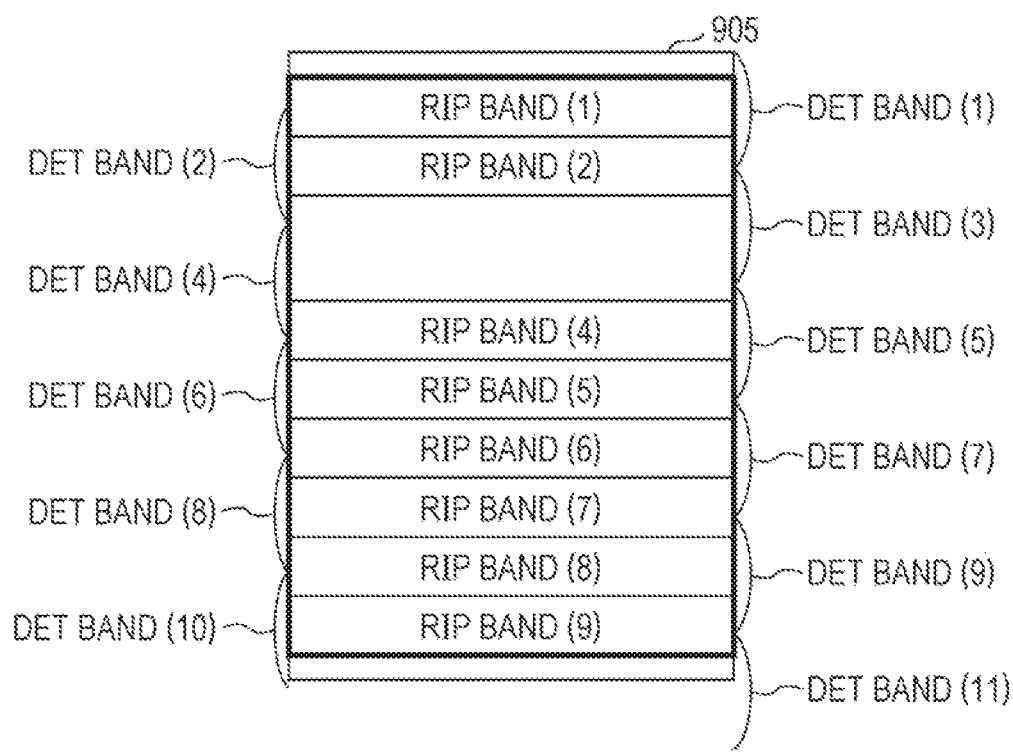
FIG. 39 is a view illustrating an example in which the amount of data further increases in comparison to the original image due to deletion of the RIP band and addition of the white image.

FIG. 38 illustrates a setting example of a DET band with respect to the image 903 in FIG. 36. In the example in FIG. 38, ten DET bands (1) to (10) are set with respect to the image 903. FIG. 39 illustrates a setting example of a DET band with respect to the image 905 in FIG. 37. In the example in FIG. 39, 11 DET bands (1) to (11) are set with respect to the image 905. As described above with reference to FIGS. 36 and 37, the white image 911 that is added is longer than the RIP band (3) that is deleted in the direction of the double-headed arrow 800, and thus the number of DET bands necessary for the image 905 is greater in comparison to the image 903.

Before an image is transmitted for detection processing, the CPU 20 determines that the amount of image data is less, that is, the number of DET bands is smaller between a case where the original image is set as a detection target (FIG. 36) and a case where an image obtained by deleting a DET band that does not include printing data and by adding the white image 911 is set as the detection target (FIG. 37). In addition, the CPU 20 sets an image in which the number of DET bands which are set is smaller as a detection processing target, and transmits the image to the detection processing unit 531.

[9. Processing Flow]

Figure 40:
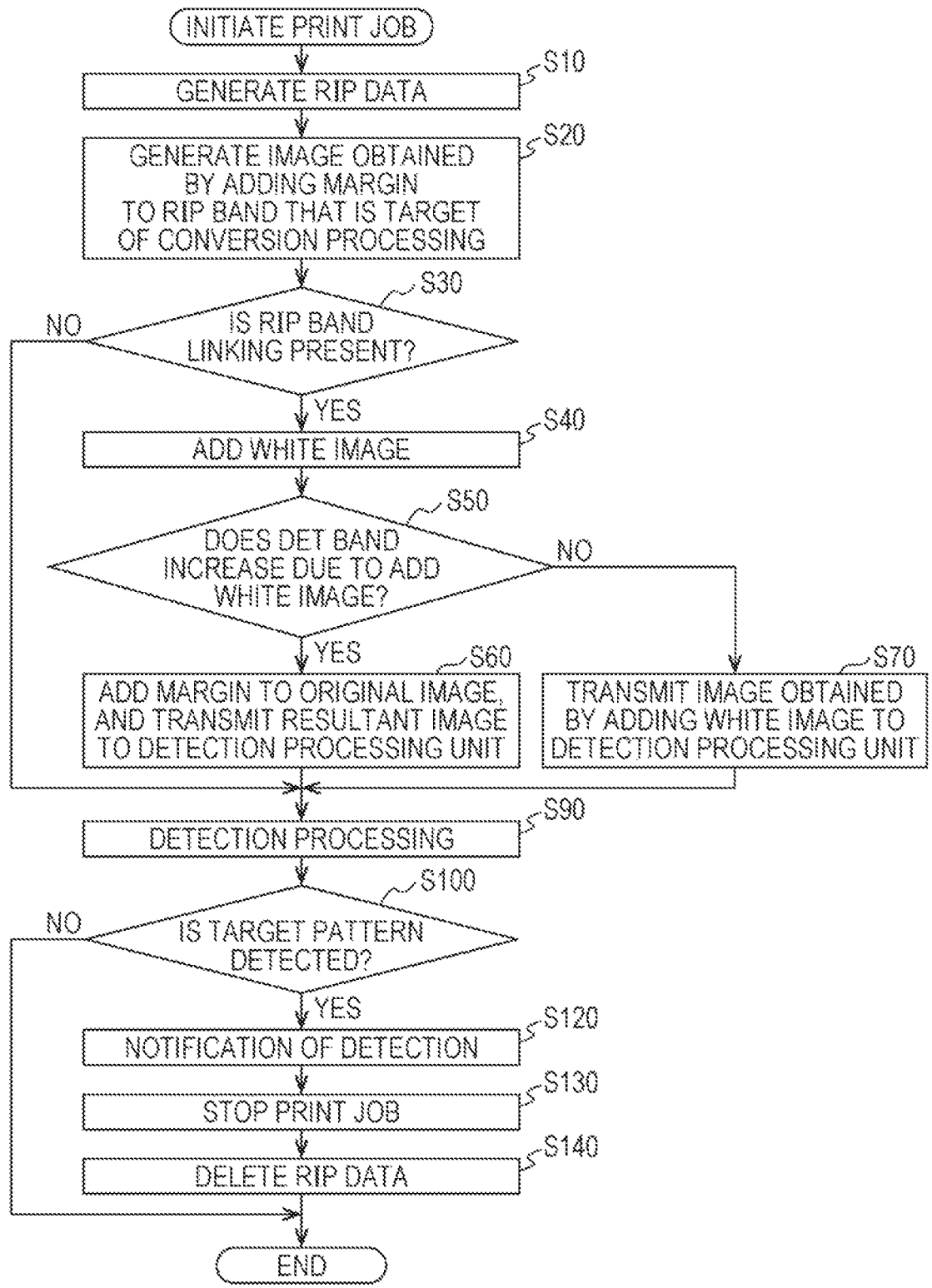
FIG. 40 is a flowchart of an example of processing that is executed in the image processing apparatus.

FIG. 40 is a flowchart illustrating an example of processing that is executed by the CPU 20 when receiving a print job from the PC 2 and the like. For example, the processing in FIG. 40 is realized when the CPU 20 executes a predetermined program.

In step S10, the CPU 20 generates RIP data from PDL data included in the print job. In an embodiment, the CPU 20 processes the PDL data for every RIP band when generating the RIP data. The CPU 20 executes conversion from a vector form into a raster form with respect to an RIP band that includes printing data. According to this, for example, the image 900 (FIG. 27) is generated.

In step S20, the CPU 20 generates an in obtained by adding a margin to an RIP band (RIP band including printing data) that is a target of the conversion processing in step S10. According to this, for example, the image 904 (FIG. 30) is generated.

In step S30, the CPU 20 determines whether or not two RIP bands, which are separated from each other in the image generated in step S10, are linked to each other in the image generated in step S20 (for example, the RIP band (2) and the RIP band (5) in FIG. 30). In a case where it is determined that RIP bands which are separated from each other in the image in step S10 and are linked to each other in the image in step S20 exist (YES in step S30), the CPU 20 allows the control to proceed to step S40. In a case where it is determined that RIP bands which are separated from each other in the image in step S10 and are linked to each other in the image in step S20 do not exist (NO in step S30), the CPU 20 allows the control to proceed to step S100.

In step S40, the CPU 20 adds the white image 911 to the image generated in step S20 in the aspect as described above with reference to FIG. 31 and the like.

In step S50, the CPU 20 determines whether or not the number of DET bands further increases in comparison to the original image due to addition of the white image. For example, the determined is made in the aspect as described above with reference to FIGS. 38 and 39. In a case where it is determined that the number of DET bands increases (YES in step S50), the CPU 20 allows the control to proceed to step S60. In a case where it is determined that the number of DET bands does not increases (NO in step S50), the CPU 20 allows the control to proceed to step S70.

In step S60, the CPU 20 transmits an image obtained by adding a margin to the original image (for example, the image 903 in FIG. 36) to the detection processing unit 531.

In step S70, the CPU 20 transmits an image (image generated in step S40) obtained by adding a white image to the detection processing unit 531.

In step S80, the CPU 20 allows the detection processing unit 531 to execute detection processing.

In step S100, the CPU 20 determines whether or not an image pattern, which becomes a print-prohibited target in the detection processing, is detected. When it is determined that the pattern is detected (YES in step S100), the CPU 20 allows the control to proceed to step S120. In a case where it is determined that the pattern is not detected (NO in step S100), the CPU 20 terminates the processing in FIG. 40. In a case where the pattern is not detected in the entirety of an image that becomes a target of a print job, the CPU 20 may transmit information, which permits printing of the print job, to the print engine 553. The print engine 553 may be configured to execute a print job relating to the print job with reception of the information set as a condition.

In step S120, the CPU 20 notifies the print engine 553 of detection of the pattern that becomes a print-prohibited target. The print engine 553 is configured not to execute print processing related to the print job that is set as a target of the notification when receiving the notification.

In step S130, the CPU 20 stops the print job. For example, in a case where the control in step S10 to step S90 is executed for every DET band, and image data of the preceding DET band flows after processing in the print processing unit 513, processing of removal of the image data and the like are executed.

In step S140, the CPU 20 deletes RIP data related to the print job, which becomes a target of the processing in FIG. 40, from the RIP buffer memory 512, and terminates the processing in FIG. 40.

[10. Determination as to Whether or not to Delete (Remove) RIP Data on Basis of REP Processing Rate]

It may be determined whether or not to execute deletion of the RIP band that does not include printing data and addition of the white image as described above with reference to FIGS. 30 and 31, and the like according to conditions other than the amount of data as described above with reference to FIGS. 36 to 39.

In an embodiment, whether or not to execute the deletion and the addition is determined on the basis of one page image processing time (hereinafter, referred to as "processing rate of the RIP processing unit 511" or simply as "processing rate") that is set with respect to the RIP processing unit 511. For example, the processing rate is determined by using resolution of an image that becomes a processing target. In a case where RIP data having relatively high resolution is generated, the amount of data to be generated by the RIP processing unit 511 in a unit area increases, and thus it is assumed that the processing rate of the RIP processing unit 511 is made to be slow.

So as to determine whether or not to execute the deletion and the addition, in an example, the CPU 20 determines whether the processing rate of the RIP processing unit 511 is equal to or greater than a predetermined rate or less than the predetermined rate. In another example, the CPU 20 determines whether or not the resolution is equal to or less than the predetermined resolution (for example, 600 dpi). More specifically, in a case where the resolution is 600 dpi, the CPU 20 determines that the processing rate of the RIP processing 511 is fast, and in a case where the resolution is 1200 dpi, the CPU 20 determines that the processing rate of the RIP processing unit 511 is slow.

In an embodiment, whether or not to execute the deletion and the addition is determined on the basis of the performance (processing rate) of the RIP processing unit 511.

In a case where the processing rate of the RIP processing unit 511 is fast, when long time is necessary for the detection processing, there is a high possibility that a user may feel delaying of the printing processing. Accordingly, in a case where the processing rate of the RIP processing unit 511 is relatively fast, the CPU 20 executes the deletion and the addition to reduce the amount of data that becomes the detection processing target.

On the other hand, in a case where the processing rate of the RIP processing unit 511 is slow, even though long time is necessary for the detection processing, there is a low possibility that a user feels delaying of the printing processing due to the detection processing. Accordingly, in a case where the processing rate of the RIP processing unit 511 is relatively slow, the CPU 20 may set an image obtained by adding a margin to the original image as the detection processing target without executing the deletion and the addition.

Figure 41:
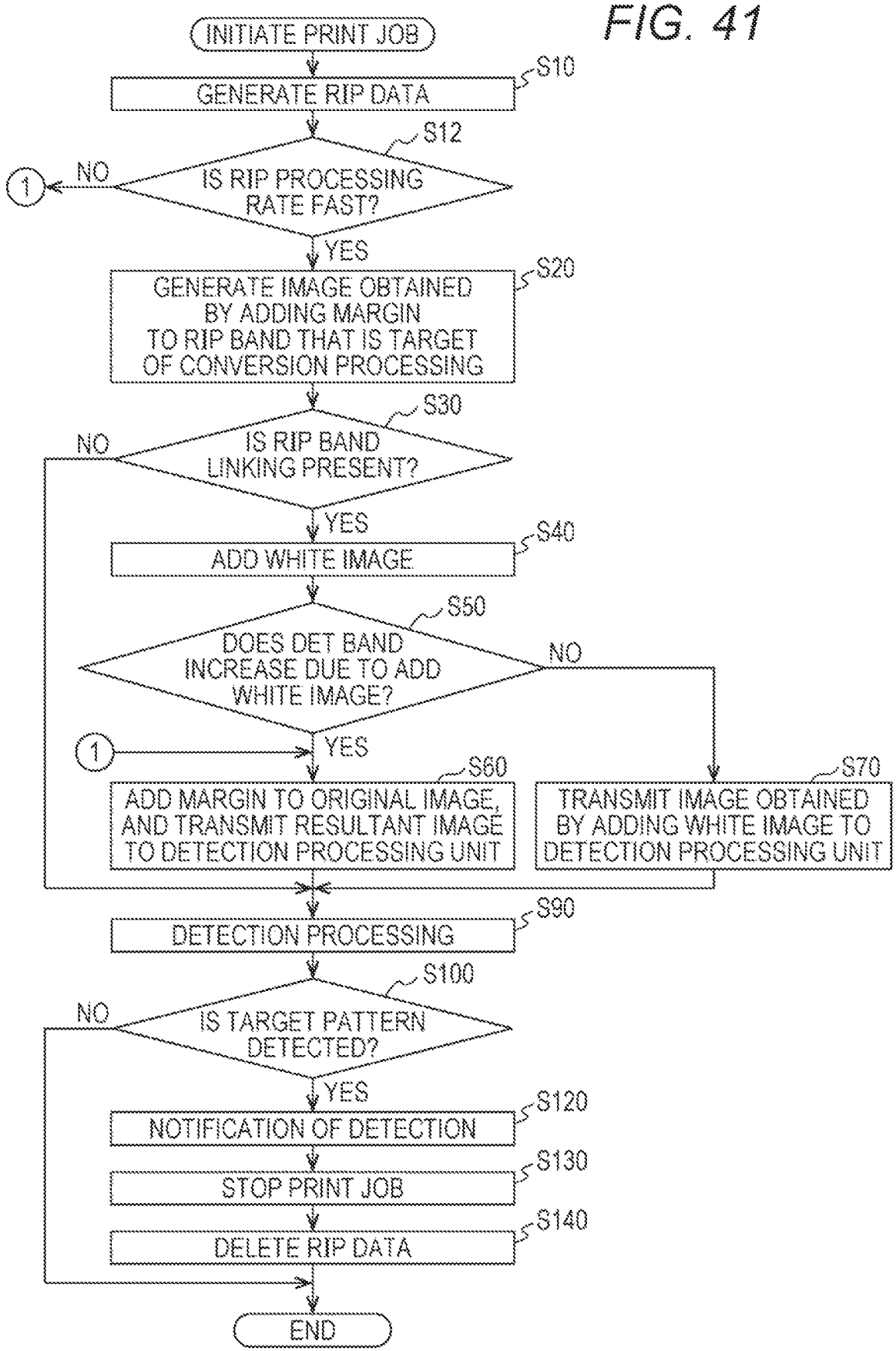
FIG. 41 is a flowchart of an example of processing that is executed in the image processing apparatus.

FIG. 41 is a flowchart relating to processing in which determination based on the processing rate of the RIP processing unit 511 is added to the processing in FIG. 40. The processing illustrated in FIG. 41 further includes step S12 in comparison to the processing illustrated in FIG. 40.

In step S12, the CPU 20 determines whether or not the processing rate of the RIP processing unit 511 is faster than a predetermined rate. In an embodiment, the processing rate is specified by resolution of an image that is a processing target. For example, the resolution of the image is included, in job data of a print job that is transmitted from the PC 2 and the like.

In a case where it is determined that the processing rate of the RIP processing unit 511 is fast (YES in step S12), the CPU 20 allows the control to proceed to step S20. The same control as described above with reference to FIG. 40 is executed after step S20.

In a case where it is determined that the processing rate of the RIP processing unit 511 is slow (NO in step S12), the CPU 20 allows the control to proceed to step S60. According to this, an image obtained by adding a margin to the original image is set as the detection processing target.

Description will be given of a specific example of an effect of the processing (FIG. 41) of determining whether or not to execute the deletion and the addition in accordance with the processing rate of the RIP processing unit 511 with reference to FIG. 42. FIG. 42 is a view illustrating a specific example of the effect of the processing in FIG. 41.

FIG. 42 illustrates a condition A and a condition B. The condition A represents a case where the processing rate of the RIP processing unit 511 is relatively fast. In the condition A, resolution of a processing target page is 600 dpi. The condition B represents a case where the processing rate of the RIP processing unit 511 is relatively slow. In the condition B, resolution of a processing target page is 1200 dpi. In the condition A, it is preferable that image data, which is obtained after executing the deletion and the addition with respect to an image after the RIP processing, is set as the detection processing target. In the condition B, it is not necessary to generate image data for the detection processing by executing, the deletion and the addition with respect to an image. Hereinafter, description will be given of each of the condition A and the condition B.

(Condition A: Case where Resolution of Processing Target Page is 600 Dpi)

In the condition A, an image 4210, which represents a processing target page, includes six RIP bands (1) to (6). Among these, the four RIP bands (1) to (3), and (6) include printing data, and the remaining two RIP bands (4) and (5) do not include printing data.

In the condition A, with respect to the image 4210, a table 4211 is shown. The table 4211 illustrates time (RIP time) necessary for RIP processing of each of the RIP bands (1) to (6) of the image 4210, and time (detection processing time) necessary for detection processing.

The RIP time of each of the RIP bands (1) to (3), and (6), which include printing data, is 0.1 seconds. The RIP time of each of the RIP bands (4) and (5), which do not include printing data, is 0 second. Accordingly, the RIP time of the entirety of the image 4210 is 0.4 seconds.

The detection processing time of each of the RIP bands (1) to (6) is 0.1 seconds. The detection processing time of the RIP band is constant regardless of whether or not the RIP band includes printing data. The detection processing time of the entirety of the image 4210 is 0.6 seconds. In the entirety of the image 4210, the detection processing time (0.6 seconds) is longer than the RIP time (0.4 seconds). More specifically, the detection processing time (0.6 seconds) is 1.5 times the RIP time (0.4 seconds).

In FIG. 42, with regard to the condition A, image data 4250 is illustrated. The image data 4250 represents data after deleting the RIP bands (4) and (5) which do not include printing data from the image 4210 and adding the white image 911 to the image 4210 instead of the RIP bands (4) and (5).

In FIG. 42, with regard to the image data 4250, a table 4251 is shown. The table 4251 illustrates detection processing time of the RIP bands (1) to (3), and (6), and the white image 911 in the image data 4250. The detection processing time of the white image 911 is 0.1 seconds. Accordingly, the detection processing time of the entirety of the image data 4250 is 0.5 seconds.

A difference between the detection processing time (0.6 seconds) of the entirety of the image 4210, and the RIP time (0.4 seconds) of the entirety of the image 4210 is 0.2 seconds. In contrast, a difference between the detection processing time (0.5 seconds) of the entirety of the image data 4250 and the RIP time (0.4 seconds) of the entirety of the image 4210 is 0.1 seconds. Accordingly, in the condition A, a time difference between the detection processing time and the RIP time is shorter in a case where the image data 4250 is set as the detection processing target in comparison to a case where the image 4210 is set as the detection processing target.

Accordingly, in the condition A, the time difference between the detection processing time and the RIP time is shorter in a case where the deletion and the addition are executed with respect to the image 4210. Accordingly, on a user side, the degree of feeling of delay in print processing due to the detection processing time is low.

(Condition B: Case where Resolution of Processing Target Page is 1200 Dpi)

Also in the condition B, as in the condition A, the image 4210, which represents a processing target page, includes six RIP bands (1) to (6). Among these, the RIP bands (1) to (3), and (6) include printing data, and the remaining two RIP bands (4) and (5) do not include printing data.

In the condition B, with regard to the image 4210, a table 4212 is shown. The table 4212 illustrates time (RIP time) necessary for RIP processing of each of the RIP bands (1) to (6) of the image 4210, and time (detection processing time) necessary for detection processing in the condition B.

The RIP time of each of the RIP bands (1) to (3), and (6), which include printing data, is 0.4 seconds. Since the resolution is changed from 600 dpi to 1200 dpi, the RIP time of each of the RIP bands including printing data becomes four times longer. The RIP time of each of the RIP bands (4) and (5), which do not include printing data, is 0 second. Accordingly, the RIP time of the entirety of the image 4210 is 1.6 seconds.

The detection processing time of each of the RIP bands (1) to (6) is 0.1 seconds, and the detection processing time of the entirety of the image 4210 is 0.6 seconds. In the entirety of the image 4210, the detection processing time (0.6 seconds) is shorter than the RIP time (1.6 seconds).

The detection processing time of the entirety of the image data 4250 is 0.5 seconds. In the condition B, the detection processing time (0.5 seconds) of the entirety of the image data 4250 is shorter than the RIP time (1.6 seconds) of the entirety of the image 4210, but the detection processing time (0.6 seconds) of the entirety of the image 4210 also shorter than the RIP time (1.6 seconds) of the entirety of the image 4210. Even when any of the image 4210 and the image data 4250 is set as the detection processing target, a situation in which the detection processing time exceeds the RIP time does not occur. That is, time is shortened. In the condition B, the reason for generating the image data 4250 does not exist. Accordingly, in the condition B, it is not necessary to generate the image data 4250 through the deletion and the addition with respect to the image 4210,

[11. Summary of Disclosure]

For example, the present disclosure can be summarized as follows.

(1) According to the present disclosure, there is provided an image processing apparatus including a generation unit (RIP processing unit 511) that generates image data in a raster form on the basis of PDL data described in a page description language, a memory (RIP buffer memory 512) that stores the image data generated by the generation unit, and a detection unit (detection processing unit 531) that outputs a predetermined signal in a case where an image of the image data stored in the memory is determined as an image including a predetermined pattern. The detection unit executes pattern recognition with respect to a region, which includes printing data, in the image of the image data, and does not execute the pattern recognition with respect to a region, which does not include printing data, in the image of the image data (in detection processing in step S90, an image of data obtained by adding the white image in step S70 is detected. In the data to which the white image is added in step S70, an RIP band, which does not include printing data, is deleted).

(2) The detection unit may execute the pattern recognition with respect to an image (for example, the image 905 in FIG. 31) that is obtained by deleting the region (for example, the RIP bands (3) and (4) in FIG. 28), which does not include the printing data, in the image of the image data, and by adding a white image (white image 911) occupying a predetermined amount to a boundary of two or more regions which include the printing data and are adjacent to each other due to the deletion in the image of the image data.

(3) The detection unit may execute the pattern recognition for every image (the DET band having a width d in FIG. 32) in a region having a predetermined width in a predetermined direction. Time detection unit may set the predetermined amount to a sum of a first amount (the length LX in FIG. 34) that occupies a range from an end of the region including the printing data to an end of the region having the predetermined width in the predetermined direction, and a second amount (the length LY in FIG. 34) that occupies a region having a width that is approximately the half of the predetermined width in the predetermined direction.

(4) The detection unit may execute the pattern recognition with respect to an image that is obtained by adding a margin to one end and the other end of the image of the image data in the predetermined direction.

(5) In a case where a length of the white image occupying the predetermined amount is shorter than a length of the region that does not include the panting data in the predetermined direction (in a case where the image 905 in FIG. 32 becomes shorter than the image 903 in FIG. 33 in the direction of the double-headed arrow 800), the detection unit may execute the pattern recognition after executing deletion of the region that does not include the printing data and addition of the White image occupying the predetermined amount. In a case where the length of the white image occupying the predetermined amount is equal to or greater than the length of the region that does not include the panting data in the predetermined direction (in a case where the image 905 in FIG. 39 becomes longer than the image 903 in FIG. 38 in the direction of the double-headed arrow 800), the detection unit may execute the pattern recognition with respect to both of the region that includes the printing data and the region that does not include the printing data in the image of the image data without executing deletion of the region that does not include the printing data and addition of the white image that occupies time predetermined amount.

(6) In a case where a processing rate of the generation unit is equal to or greater than a predetermined rate (YES in step S12 in FIG. 41), the detection unit may not execute the pattern recognition with respect to the region that does not include the printing data in the image data (steps S20 to S50, and S70), and in a case Where the processing rate of the generation unit is less than a predetermined rate (NO in step S12 in FIG. 41), the detection unit may execute the pattern recognition also with respect to the region that does not include the printing data in the image data (step S60).

Although embodiments of the present invention have been described and illustrated in detail, the disclosed embodiments are made for purposes of illustration and example only and not limitation. The scope of the present invention should be interpreted by terms of the appended claims and intended to include meanings equivalent to the claims and all modifications within the scope. In addition, the inventions described in the embodiment and each of the modifications are intended to be implemented as much as possible, either singly or in combination.

What is claimed is:

1. An image processing apparatus comprising:
a hardware processor that:
generates image data in a raster form on the basis of PDL data described in a page description language;
stores the image data generated by the hardware processor; and
outputs a predetermined signal in a case where an image of the image data stored in the hardware processor is determined as an image including a predetermined pattern,
wherein the hardware processor determines whether or not a region in the image of the image data includes printing data, and executes pattern recognition with respect to a region, which includes printing data, in the image of the image data, and does not execute the pattern recognition with respect to a region, which does not include printing data, in the image of the image data.

2. The image processing apparatus according to claim 1, wherein the hardware processor executes the pattern recognition with respect to an image that is obtained by deleting the region, which does not include the priming data, in the image of the image data, and by adding a white image occupying a predetermined amount to a boundary of two or more regions which include the printing data and which are adjacent to each other due to the deletion in the image of the image data.

3. The image processing apparatus according to claim 2, wherein the hardware processor executes the pattern recognition for every image in a region having a predetermined width in a predetermined direction, and the hardware processor sets the predetermined, amount to a sum of a first amount that occupies a range from an end of the region including the printing data to an end of the region having the predetermined width in the predetermined direction, and a second amount that occupies a region having a width that is approximately the half of the predetermined width in the predetermined direction.

4. The image processing apparatus according to claim 3, wherein the hardware processor executes the pattern recognition with respect to an image that is obtained by adding a margin to one end and the other end of the image of the image data in the predetermined direction.

5. The image processing apparatus according to claim 3, wherein in a case where a length of the white image occupying the predetermined amount is shorter than a length of the region that does not include the printing data in the predetermined direction, the hardware processor executes the pattern recognition after executing deletion of the region that does not include the printing data and addition of the white image occupying the predetermined amount, and
in a case where the length of the white image occupying the predetermined amount is equal to or greater than the length of the region that does not include the printing data in the predetermined direction, the hardware processor executes the pattern recognition with respect to both of the region that includes the printing data and the region that does not include the printing data in the image of the image data without executing deletion of the region that does not include the printing data and addition of the white image that occupies the predetermined amount.

6. The image processing apparatus according to claim 1, wherein in a case where a processing rate of the hardware processor is equal to or greater than a predetermined rate, the hardware processor does not execute the pattern recognition with respect to the region that does not include the printing data in the image data, and
in a case where the processing rate of the hardware processor is less than a predetermined rate, the hardware processor executes the pattern recognition also with respect to the region that does not include the printing data in the image data.

7. A method for controlling an image processing apparatus that executes pattern recognition with respect to PDL data described in a page description language, the method comprising:
generating image data in a raster form on the basis of the PDL data;
storing the image data in a hardware processor;
performing pattern recognition with respect to an image of the image data stored in the hardware processor; and
outputting a predetermined signal in a case where the image of the image data is determined as an image including a predetermined pattern in the pattern recognition,
wherein the method further comprises determining whether or not a region in the image of the image data includes printing data, and the pattern recognition is executed with respect to a region that includes printing data in the image of the image data, and is not executed with respect to a region that does not include the printing data.

8. A non-transitory recording medium storing a computer readable program causing a computer to execute pattern recognition with respect to PDL data described in a page description language, the program causing the computer to execute:

generating image data in a raster form on the basis of the PDL data;

storing the image data in a hardware processor;

performing pattern recognition with respect to an image of the image data stored in the hardware processor; and outputting a predetermined signal in a case where the image of the image data is determined as an image including a predetermined pattern in the pattern recognition, wherein the pro ram causes the computer further to execute determining whether or not a region in the image of the data includes printing data, and the pattern recognition is executed with respect to a region that includes printing data in the image of the image data, and is not executed with respect to a region that does not include the printing data.

9. The non-transitory recording medium storing a computer readable program according to claim 8, wherein the pattern recognition is executed with respect to an image that is obtained by deleting the region, which does not include the printing data, in the image of the image data, and by adding a white image occupying a predetermined amount to a boundary of two or more regions which include the printing data and which are adjacent to each other due to the deletion in the image of the image data.

10. The non-transitory recording medium storing a computer readable program according to claim 9, wherein the pattern recognition is executed for every image in a region having a predetermined width in a predetermined direction, and the predetermined amount is set to a sum of a first amount that occupies a range from an end of the region including the printing data to an end of the region having the predetermined width in the predetermined direction, and a second amount that occupies a region having a width that is approximately the half of the predetermined width in the predetermined direction.

11. The non-transitory recording medium storing a computer readable program according to claim 10, wherein the pattern recognition is executed with respect to an image that is obtained by adding a margin to one end and the other end of the image of the image data in the predetermined direction.

12. The non-transitory recording medium storing a computer readable program according to claim 10, wherein in a case where a length of the white image occupying the predetermined amount is shorter than a length of the region that does not include the printing data in the predetermined direction, the pattern recognition is executed after executing deletion of the region that does not include the printing data and addition of the white image occupying the predetermined amount, and in a case where the length of the white image occupying the predetermined amount is equal to or greater than the length of the region that does not include the printing data in the predetermined direction, the pattern recognition is executed with respect to both of the region that includes the printing data and the region that does not include the printing data in the image of the image data without executing deletion of the region that does not include the printing data and addition of the white image that occupies the predetermined amount.

13. The non-transitory recording medium storing a computer readable program according to claim 8, wherein in a case where a processing rate in generation of image data in a raster form on the basis of the PDL data is equal to or greater than a predetermined rate, the pattern recognition is not executed with respect to the region that does not include the printing data in the image data, and in a case where the processing rate in generation of the image data in a raster form on the basis of the PDL data is less than a predetermined rate, the pattern recognition is executed also with respect to the region that does not include the printing data in the image data.

14. The image processing apparatus according to claim 1, wherein the hardware processor further deletes the region, which does not include printing data, in the image of the image data.

15. The method for controlling an image processing apparatus according to claim 7, wherein the method further comprises deleting the region, which does not include printing data, in the image of the image data.

16. The non-transitory recording medium storing a computer readable program according to claim 8, wherein the program further causes the computer to execute deleting the region, which does not include printing data, in the image of the image data.

* * * * *